United States Patent
Christopherson et al.

(10) Patent No.: US 11,118,612 B2
(45) Date of Patent: Sep. 14, 2021

(54) MANUAL HYDRAULIC OVERRIDE PUMPS FOR USE WITH ACTUATORS

(71) Applicant: Emerson Process Management, Valve Automation, Inc., Houston, TX (US)

(72) Inventors: Matt Christopherson, Richmond, TX (US); Michael Cheng, Sugar Land, TX (US); Joseph Sun, Katy, TX (US)

(73) Assignee: Emerson Process Management, Valve Automation, Inc., Houston, TX (US)

( * ) Notice: Subject to any disclaimer, the term of this patent is extended or adjusted under 35 U.S.C. 154(b) by 0 days.

(21) Appl. No.: 16/523,760

(22) Filed: Jul. 26, 2019

(65) Prior Publication Data

US 2021/0025411 A1 Jan. 28, 2021

(51) Int. Cl.
  *F15B 20/00* (2006.01)
  *E02F 9/22* (2006.01)

(52) U.S. Cl.
  CPC .......... *F15B 20/004* (2013.01); *E02F 9/2292* (2013.01); *F15B 2211/2053* (2013.01); *F15B 2211/2656* (2013.01)

(58) Field of Classification Search
  CPC .............. F15B 20/004; F15B 221/2656; F15B 2211/2053; E02F 9/2292
  USPC .......................................................... 60/428
  See application file for complete search history.

(56) References Cited

U.S. PATENT DOCUMENTS

| 1,881,449 | A |   | 10/1932 | Forsythe |          |
|-----------|---|---|---------|----------|----------|
| 3,130,675 | A | * | 4/1964  | Cripe    | F04B 9/14 |
|           |   |   |         |          | 417/287  |
| 3,360,932 | A | * | 1/1968  | Lech     | B62D 5/097 |
|           |   |   |         |          | 60/386   |
| 3,556,151 | A | * | 1/1971  | Masuda   | F16K 11/0743 |
|           |   |   |         |          | 137/625.21 |
| 4,202,453 | A | * | 5/1980  | Wilkes, Jr. | B66C 23/54 |
|           |   |   |         |          | 180/235  |

(Continued)

FOREIGN PATENT DOCUMENTS

CN   107055418    8/2017
FR    2231870    12/1974

(Continued)

OTHER PUBLICATIONS

International Searching Authority, "Search Report and Written Opinion", issued in connection with PCT Application No. PCT/US2020/042315, dated Oct. 12, 2020, 6 pages.

*Primary Examiner* — Abiy Teka
*Assistant Examiner* — Daniel S Collins
(74) *Attorney, Agent, or Firm* — Hanley, Flight & Zimmerman, LLC

(57) ABSTRACT

Manual hydraulic override pumps for use with actuators are described herein. An example apparatus includes a manifold including a reservoir port to be fluidly coupled to a reservoir of fluid, a pump port to be fluidly coupled to a pump, a first actuator port to be fluidly coupled to a first chamber of an actuator, and a second actuator port to be fluidly coupled to a second chamber of the actuator. The example apparatus also includes a rotor disposed in a cavity formed in the manifold. The rotor is rotatable between a first actuating position in which the rotor fluidly couples the first actuator port and the pump port, and a second actuating position in which the rotor fluidly couples the second actuator port and the pump port.

20 Claims, 15 Drawing Sheets

(56) References Cited

U.S. PATENT DOCUMENTS 4,501,297 A * 2/1985 Baker .................. F16K 31/042
137/554
9,587,454 B1 3/2017 Beard et al.

FOREIGN PATENT DOCUMENTS

JP 09-315327 * 5/1997 ............. B62D 5/083
KR 20180085083 7/2018

* cited by examiner

MANUAL HYDRAULIC OVERRIDE PUMPS FOR USE WITH ACTUATORS

FIELD OF THE DISCLOSURE

This disclosure relates generally to hydraulic pumps and, more particularly, to manual hydraulic override pumps for use with actuators.

BACKGROUND

Actuators automate control valves by providing a force and/or torque that causes motion and/or rotation to open or close a valve. In operation, a controller may cause an actuator to position a flow control member of a valve to a desired position to regulate fluid flowing through the valve. Hydraulic override pumps can be used in process control systems to override automatic control of valves or other devices in the process control system. During emergency situations, power failures, or if air supply to a pneumatic actuator is shut down, for example, it may be necessary to manually override the position of a flow control member of a valve to a predetermined position. A human operator can operate a hydraulic override pump to manually pump fluid into the actuator, thereby controlling the state of the valve (e.g., closing the valve).

SUMMARY

An apparatus disclosed herein includes a manifold including a reservoir port to be fluidly coupled to a reservoir of fluid, a pump port to be fluidly coupled to a pump, a first actuator port to be fluidly coupled to a first chamber of an actuator, and a second actuator port to be fluidly coupled to a second chamber of the actuator. The apparatus also includes a rotor disposed in a cavity formed in the manifold. The rotor is rotatable between: a first actuating position in which the rotor fluidly couples the first actuator port and the pump port, and the rotor fluidly couples the second actuator port and the reservoir port; and a second actuating position in which the rotor fluidly couples the second actuator port and the pump port, and the rotor fluidly couples the first actuator port and the reservoir port.

An apparatus disclosed herein includes a hand pump, a reservoir, a manifold having flow paths to fluidly connect to the hand pump, the reservoir, and first and second chambers of an actuator, and a handwheel rotatably coupled to the manifold to be rotated by a human operator. The handwheel is rotatable to: a first actuating position to enable the hand pump to supply hydraulic fluid from the reservoir to the first chamber to move a shaft of the actuator in a first direction; and a second actuating position to enable the hand pump to supply hydraulic fluid from the reservoir to the second chamber to move the shaft of the actuator in a second direction opposite the first direction.

An apparatus disclosed herein includes a manifold including a first port to be fluidly coupled to a first chamber of an actuator, a second port to be fluidly coupled to a second chamber of the actuator, a third port to be fluidly coupled to a hand pump, and a fourth port to be fluidly coupled to a reservoir. The apparatus further includes a selector valve including a rotor disposed in a cavity of the manifold. The rotor has pairs of openings connected by respective passageways form in the rotor. The rotor is rotatable in the cavity to align the pairs of openings with certain openings in a wall of the cavity that are fluidly coupled to the first, second, third, and fourth ports.

Figure 1:
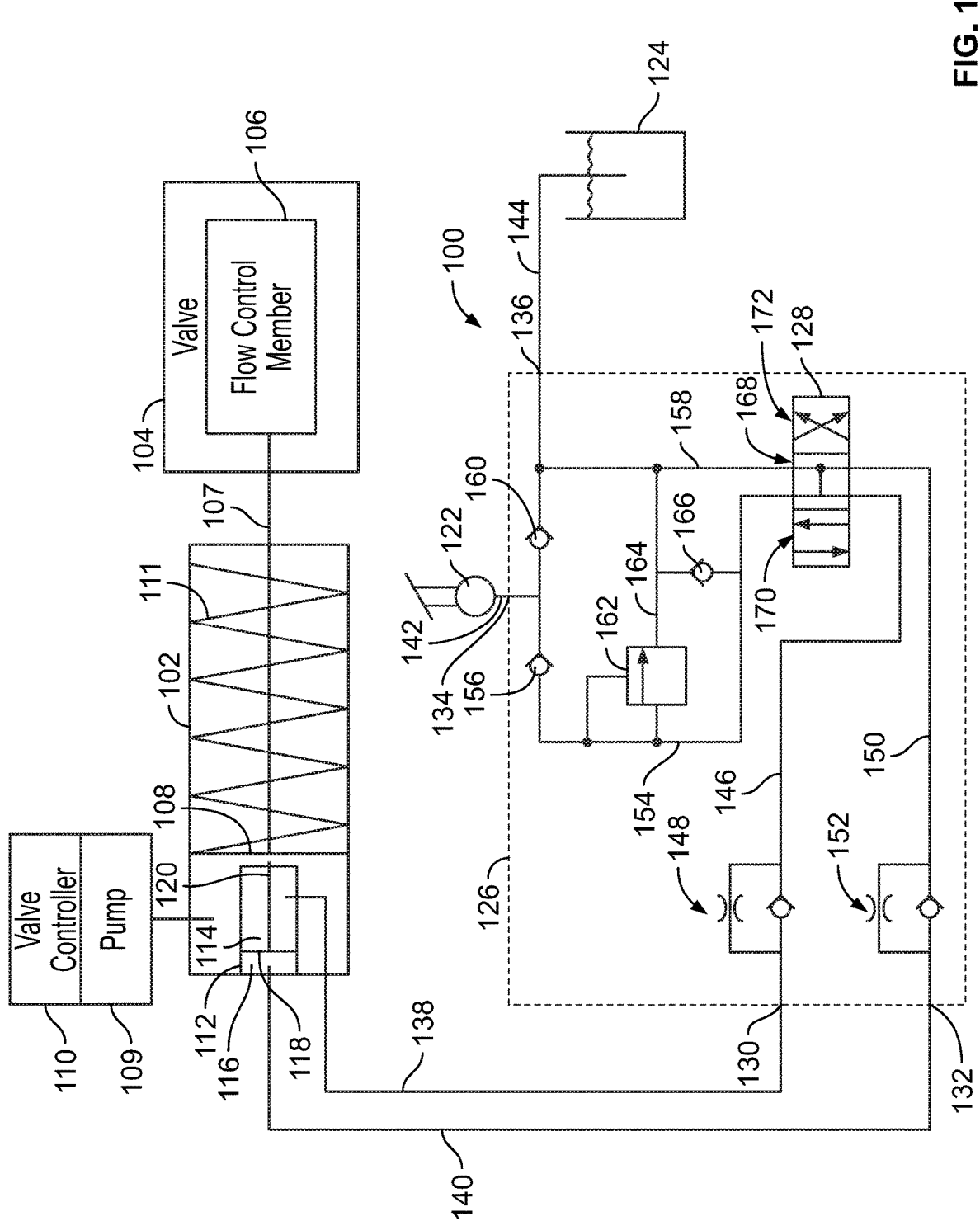
FIG. 1 is a schematic illustration of an example manual hydraulic override pump used in connection with an example actuator for an example valve.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Actuators are commonly used in process control systems to automate control of certain devices or components of the process control system. For example, actuators are commonly used to automate control valves by providing a force and/or torque that may cause linear and/or rotary motion to open or close a valve. In operation, a controller may cause the actuator to position a flow control member of the valve in a desired position to regulate fluid flowing through the valve. During emergency situations, power failures, and/or if air/hydraulic supply to the actuator is shut down, for example, it may be necessary to manually override the position of the flow control member of the valve to a desired position (e.g., a closed position). Therefore, many actuators include a manual hydraulic override pump that permits a human operator to manually pump hydraulic fluid into or away from the actuator and thereby cause the flow control member to move to the desired position. These manual hydraulic override pumps do not require an outside power source. Instead, known manual hydraulic override pumps include hand pumps and selector valves to direct the pumping fluid to one chamber or another chamber of the actuator.

Known hydraulic override pumps utilize a selector valve having a plunger that is moved in a linear direction to connect the hand pump to one of the chambers of the actuator. However, this type of selector valve requires a relatively large amount of space to accommodate the movement of the plunger. Thus, known hydraulic override pumps are relatively large in size. Further, this type of linear plunger selector valve utilizes rubber seals that tend to wear and degrade over time, which results in leakage and inefficient pumping operation.

Disclosed herein are example apparatus, methods, and articles of manufacture that that address the drawbacks noted above. Example manual hydraulic override pumps are disclosed herein that include a selector valve (which may also be referred to as a flow control valve) having a rotor that is rotatable in a cavity of a manifold. The rotor is rotatable within the cavity to connect various ports on the manifold. The example manual hydraulic override pump can be implemented in connection with an actuator that is used to control a position of a flow control member of a valve. If a controller and/or pump associated with the actuator fails, for example, the example manual hydraulic override pump can be used to manually operate the actuator and thereby move the flow control member (e.g., to open the valve, to close the valve, to partially open the valve, etc.).

In some examples, the manual hydraulic override pump includes a handwheel that is coupled to the rotor by a shaft. A human operator can rotate the handwheel, thereby rotating the rotor in the cavity. The rotor includes a sealing surface that is engaged with and slides along a disk in the manifold. The disk has openings that align with passageways in the manifold connected to different ports. In particular, the manifold has a pump port that is fluidly coupled to a pump, such as a hand pump, a reservoir port that is fluidly coupled to a reservoir of hydraulic fluid, a first actuating port that is fluidly coupled to a first chamber of the actuator, and a second actuating port that is fluidly coupled to a second chamber of the actuator. The rotor has pairs of openings in the sealing surface that are connected by respective passageways in the rotor. The rotor can be rotated (via the handwheel) to align different pairs of the openings with different openings in the disk, thereby fluidly connecting various ones of the ports. In some examples, the rotor and the disk are constructed of metal, such as tungsten carbide. The metal-to-metal contact between the rotor and the disk provides excellent sealing performance. Further, unlike known selector valves that use rubber seals that tend to wear, the example metal-to-metal sealing interface exhibits minimal (if any) wear and, thus, provides increased lifespan.

In some examples, the example rotor can be rotated (via the handwheel) between three positions including a neutral position, a first actuating position, and a second actuating position. In the neutral position, the hand pump is fluidly coupled to the reservoir, such that any pumping of the hand pump has no effect. Further, the first and second chambers of the actuator are fluidly coupled and pressure in the first and second chambers is equalized. Thus, during normal operation of the actuator, the rotor is left in the neutral position. If the actuator becomes inoperable and a human operator desires to move the flow control member of the valve in a first direction, the operator may turn the handwheel (e.g., 45° to the left from the neutral position) to rotate the rotor to the first actuating position. In the first actuating position, the rotor fluidly connects various passageways in the manifold such that the hand pump is fluidly coupled to the first chamber of the actuator, and the reservoir is fluidly coupled to the second chamber of the actuator. The hand pump can then be used to pump hydraulic fluid into the first chamber of the actuator to move the flow control member in a first direction (e.g., to close the valve). If the human operator desires to move the flow control member in the opposite direction, the human operator can turn the handwheel (e.g., 45° to the right from the neutral position) to rotate the rotor to the second actuating position. In the second actuating position, the rotor fluidly connects various passageways in the manifold such that the hand pump is fluidly coupled to the second chamber of the actuator, and the reservoir is fluidly coupled to the first chamber of the actuator. The hand pump can then be used to pump hydraulic fluid into the second chamber of the actuator to move the flow control member in a second direction opposite the first direction (e.g., to open the valve).

The use and arrangement of the rotor in the manifold results in a smaller, more compact override pump. As such, example override pumps disclosed herein can be utilized in more applications or environments than known override pumps that require a larger amount of space. Further, the use of the rotor greatly reduces the number of parts or components, which greatly reduces assembly time and manufacturing costs associated with the override pump.

Also disclosed herein is an example reset cylinder that can be actuated (e.g., via a command signal from a control room) to move the handwheel (and, thus, the rotor) back to the neutral position. Thus, it is not required for a human operator to manually switch the selector valve back to the neutral position.

Turning to the figures, FIG. 1 is a schematic illustration of an example hydraulic override pump 100 constructed in accordance with the teaching of this disclosure. In FIG. 1, the example hydraulic override pump 100 is shown in connection with an example actuator 102 that is used to control a valve 104. In particular, the actuator 102 is used to control a position of a flow control member 106 of the valve 104, thereby affecting the flow of fluid through the valve 104. The example manual hydraulic override pump 100 may be used to manually actuate the actuator 102 to control the position of the flow control member 106, as disclosed in further detail herein.

In this example, the actuator 102 has a stem or shaft 107 that is coupled (e.g., directly, via a valve stem or shaft, etc.) to the flow control member 106 of the valve 104. The shaft 107 is coupled to a piston 108 in the actuator 102. In the illustrated example, a valve controller 110, such as a positioner, for example, is shown. In the illustrated example, the valve controller 110 controls the operation of a pump 109 (e.g., via a control signal from a control room) to supply pressurized hydraulic fluid to the actuator 102 to move the piston 108, thereby moving the flow control member 106 of the valve 104 to a desired position. In other examples, the valve controller 110 may alternatively control the flow of instrument air (rather than hydraulic fluid) to the actuator 102 to move the piston 108 in a similar manner. In the illustrated example, the actuator 102 includes a return spring 111 to bias the piston 108 against the force of the fluid operating on the opposite side of the piston 108. The valve controller 110 may release pressure from the actuator 102 to enable the piston 108 (and, thus, the flow control member 106) to be moved by the spring 111 to the actuator's failure position (i.e., the position of the actuator 102 absent an outside force supplied by a pressurized fluid). In other examples, the actuator 102 may not include a return spring.

In some instances, the pump 109, the controller 110, or a related component such as an instrument air supply may become inoperable (e.g., due to a failed part, due to a power outage, etc.). In such a situation, the hydraulic manual override pump 100 may be used to manually pump fluid into the actuator 102 to move the flow control member 106 and control the state of the valve 104. In the illustrated example, the actuator 102 includes a hydraulic override cylinder 112 that is operated by the manual hydraulic override pump 100. In this example, the hydraulic override cylinder 112 is a double-acting actuator having a first chamber 114 (e.g., a first cylinder) and a second chamber 116 (e.g., a second cylinder) separated by a piston 118 (which may be referred to as a driver). A stem 120 is coupled to the piston 118 of the hydraulic override cylinder 112. When the first chamber 114 is pressurized and the piston 118 moves to the left in FIG. 1, the stem 120 moves to the left and enables the piston 108 of the actuator 102 and, thus, the flow control member 106 of the valve 104, to move under normal operation based on the balance of forces operating on each side of the piston 108 (e.g., in a first direction, to the left in FIG. 1). When the second chamber 116 is pressurized and the piston 118 moves to the right in FIG. 1, the stem 120 moves the piston 108 of the actuator 102 to the right in FIG. 1 and, thus, moves the flow control member 106 of the valve 104 away from the failure position (e.g., in a second direction). In this manner, the manual hydraulic override pump 100 can be used to override the actuator 102 and control the flow control member 106. While in the illustrated example the actuator 102 is a linear actuator, the manual hydraulic override pump 100 and hydraulic override cylinder 112 can similarly be used in connection with a rotary actuator that rotates a flow control member of a valve (e.g., a butterfly valve). In such an example, the first and second directions of the shaft 107 may be rotating in a clockwise and counter-clockwise directions.

In the illustrated example, the manual hydraulic override pump 100 includes a pump 122, a reservoir 124 containing hydraulic fluid (e.g., oil), and a manifold 126 with a selector valve 128. In this example, the pump 122 is a hand pump, referred to herein as the hand pump 122. The manifold 126 has fluid lines, flow paths, or passageways that connect to the hand pump 122, the reservoir 124, the first chamber 114, and the second chamber 116. The selector valve 128 may be operated to connect various ones of the fluid lines to form flow paths between certain ones of the hand pump 122, the reservoir 124, the first chamber 114, and the second chamber 116.

In the illustrated example, the example manifold 126 has a first actuator port 130 that is to be fluidly coupled to the first chamber 114 of the actuator 102, a second actuator port 132 that is to be fluidly coupled to the second chamber 116 of the actuator 102, a pump port 134 that is to be fluidly coupled to the hand pump 122, and a reservoir port 136 that is to be fluidly coupled to the reservoir 124. In this example, the first actuator port 130 is fluidly coupled to the first chamber 114 via a fluid line 138 (e.g., a first fluid line), the second actuator port 132 is fluidly coupled to the second chamber 116 via a fluid line 140 (e.g., a second fluid line), the pump port 134 is fluidly coupled to the hand pump 122 via a fluid line 142 (e.g., a third fluid line), and the reservoir port 136 is fluidly coupled to the reservoir 124 via a fluid line 144 (e.g., a fourth fluid line). While in the illustrated example the hand pump 122, the reservoir 124, and the actuator 102 are fluidly coupled to the manifold 126 via fluid lines, in other examples, the hand pump 122, the reservoir, and/or the actuator 102 may be directly coupled to the manifold 126 such that no fluid lines are used.

In the illustrated example, the manifold 126 includes a fluid line 146 that fluidly couples the first actuator port 130 and the selector valve 128. A first check valve and orifice 148 are disposed in the fluid line 146 to control the flow of fluid through the fluid line 146. Similarly, the manifold 126 includes a fluid line 150 that fluidly couples the second actuator port 132 and the selector valve 128, and a second check valve and orifice 152 are disposed in the fluid line 150 to control the flow of fluid through the fluid line 150.

In the illustrated example, the manifold 126 includes a fluid line 154 that fluidly couples the pump port 134 and the selector valve 128. A first check valve 156 is disposed in the fluid line 154. The manifold also includes a fluid line 158 that fluidly couples the reservoir port 136 and the selector valve 128. The fluid line 158 branches off and is fluidly coupled to the pump port 134. A second check valve 160 is disposed in the fluid line 158. When the hand pump 122 is operated, fluid from the reservoir 124 flows through the second check valve 160 and into the hand pump 122, and then the fluid is pushed through the first check valve 156 to the selector valve 128.

In the illustrated example, the manifold 126 includes a pressure relief valve 162 disposed in a fluid line 164 between the fluid line 154 and the fluid line 158 to relieve excess pressure. Further, a third check valve 166 is disposed between the fluid line 154 and the fluid line 164, which enables instant higher pressure in the fluid line 158 (from the reservoir 124) to be released to ensure the safety of the reservoir 124.

In the illustrated example, the selector valve 128 is operable between three positions or states including a neutral position 168, a first actuating position 170, and a second actuating position 172. These positions correspond to a position of a rotor 404 (FIG. 4) of the selector valve 128 disclosed in further detail herein. In the neutral position 168, which is the position shown in FIG. 1, the selector valve 128 fluidly couples the fluid lines 146, 150, 154, 158. As such, the first and second chambers 114, 116 are fluidly connected, which enables the pressures in the first and second chambers 114, 116 to equalize. Further, because the fluid lines 154 and 158 are fluidly connected, any pumping of the hand pump 122 causes hydraulic fluid to cycle around through the hand pump 122 and, thus, has no effect on either of the first or second chambers 114, 116.

In the first actuating position 170, the selector valve 128 fluidly couples the fluid line 146 and the fluid line 154 and, thus, fluidly couples the pump port 134 and the first actuator port 130. Then, when the hand pump 122 is activated (e.g., via a human operator), hydraulic fluid is supplied to (e.g., pumped into) the first chamber 114 of hydraulic override cylinder 112, thereby enabling (e.g., via return force from the return spring 111) the piston 108 and the shaft 107 to move to the left in FIG. 1 and, thus, moving the flow control member 106. Further, in the first actuating position 170, the selector valve 128 fluidly couples the fluid line 150 and the fluid line 158 and, thus, fluidly couples the reservoir port 136 and the second actuator port 132. As a result, hydraulic fluid in the second chamber 116 is pushed back to the reservoir 124 as the piston 118 moves to the left in FIG. 1.

In the second actuating position 172, the selector valve 128 fluidly couples the fluid line 150 and the fluid line 154 and, thus, fluidly couples the pump port 134 and the second actuator port 132. Then, when the hand pump 122 is activated (e.g., via a human operator), hydraulic fluid is supplied to (e.g., pumped into) the second chamber 116 of the hydraulic override cylinder 112, thereby causing the piston 108 and the shaft 107 to move to the right in FIG. 1 and, thus, moving the flow control member 106. Further, in the second actuating position 172, the selector valve 128 fluidly couples the fluid line 146 and the fluid line 158 and, thus, fluidly couples the reservoir port 136 and the first actuator port 130. As a result, hydraulic fluid in the first chamber 114 is pushed back to the reservoir 124 as the piston 118 is moved to the right in FIG. 1.

While in the illustrated example the actuator 102 is a single-acting actuator, in other examples, the actuator 102 may be implemented as double-acting actuator without a return spring. In such an example, the shaft 120 of the hydraulic override cylinder 112 may be coupled (directly or indirectly) to the shaft 107 of the actuator 102 to move the shaft 107 in one direction or the other. Further, while in the illustrated example, the hydraulic override cylinder 112 is a double-acting actuator, in other examples, the hydraulic override cylinder 112 may be implemented as a single-acting actuator with a return spring. In such an example, only one of the first actuating port 130 or the second actuator port 132 is fluidly coupled to the hydraulic override cylinder 112. In one actuating position, pressure can be applied to the hydraulic override cylinder 112. In the other actuating position, pressure can be relieved from the hydraulic override cylinder 112. In another example, single-acting cylinders can be disposed on opposite sides of a double-acting main actuator (e.g., an actuator with no return spring). In such an example, the first actuating position 170 would cause the shaft of the double-acting main actuator to move in one direction, and the second actuating position 172 would cause the shaft of the double-acting actuator to move in the opposite direction.

Figure 2B:
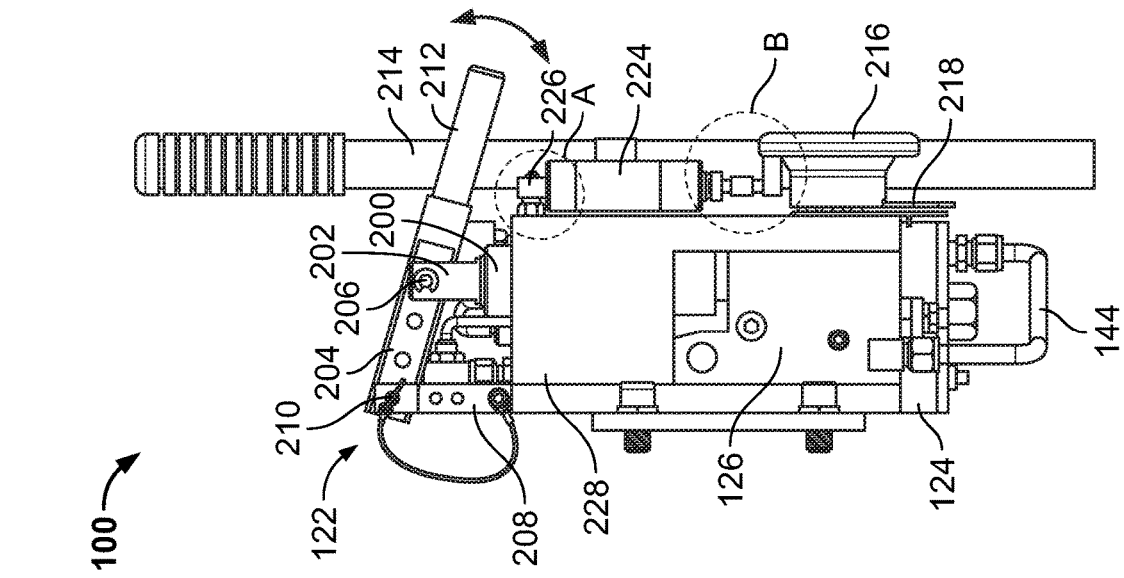
FIG. 2B is a side view of the example manual hydraulic override pump of FIG. 2A.
Figure 2A:
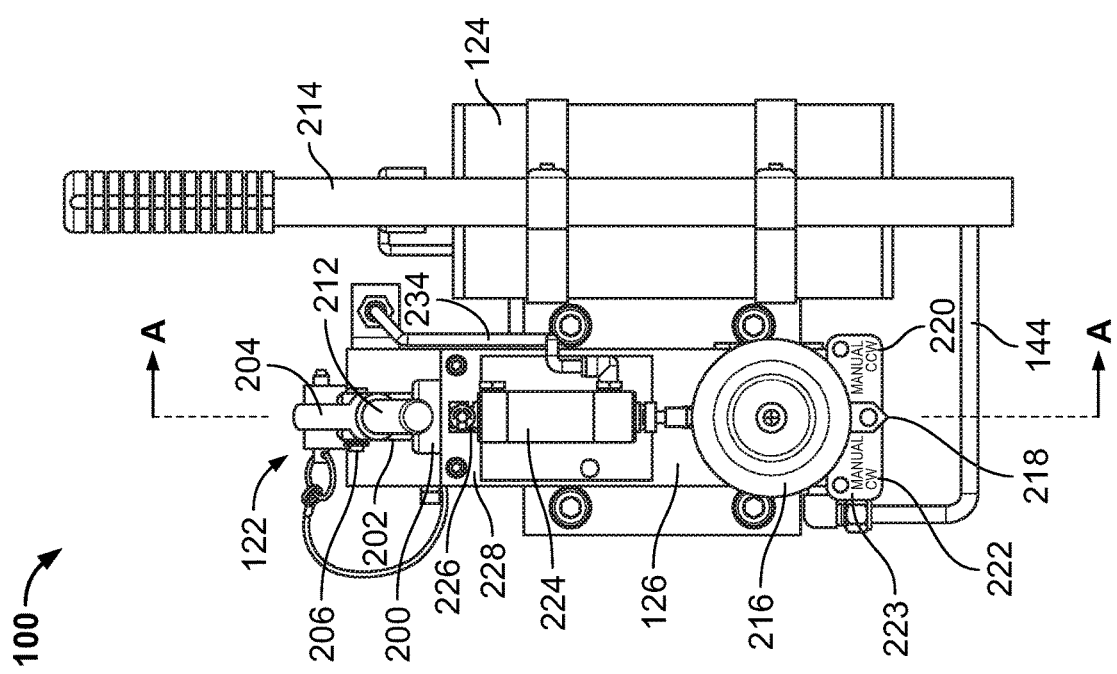
FIG. 2A is a front view of an example physical implementation of the example manual hydraulic override pump of FIG. 1.

FIGS. 2A and 2B illustrate an example physical implementation of the example manual hydraulic override pump 100. The actuator 102, the valve 104, and the fluid lines 138, 140 of FIG. 1 are not shown.

As shown in FIGS. 2A and 2B, the manual hydraulic override pump 100 includes the hand pump 122, the reservoir 124, and the manifold 126. The reservoir 124 is fluidly coupled to the manifold 126 via the fluid line 144. In the illustrated example, the hand pump 122 includes a pump cylinder 200 and a pump rod 202. The pump rod 202 is movable within the pump cylinder 200 to pull fluid into or push fluid out of a chamber in the pump cylinder 200. As the pump rod 202 moves up (out from the pump cylinder 200), backpressure is created in the chamber of the pump cylinder 200, and fluid is pulled from the reservoir 124 into the chamber of the pump cylinder 200. When the pump rod 202 moves back into the chamber of the pump cylinder 200, the fluid is forced out of the chamber of the pump cylinder 200 and toward the selector valve 128 (FIG. 1) in the manifold 126.

In the illustrated example, the hand pump 200 includes a lever 204 that rotates to move the pump rod 202 within the pump cylinder 200. In the illustrated example, the pump rod 202 is rotatably coupled to the lever 204 at a first joint 206. Further, as shown in FIG. 2B, the lever 204 is rotatably coupled to an example support 208 at a second joint 210. In the illustrated example, the support 208 is coupled to the manifold 126. In the illustrated example, an end of the lever 204 has a pump handle 212 to be grasped by a human operator. During operation, the human operator moves the lever 204 up and down (as shown by the arrows) to pump fluid. In this example, the hand pump 122 is entirely a manual pump. In other words, the hand pump 122 is not activated or actuated via an automatic system.

In some examples, the manual hydraulic override pump 100 includes an example extension bar 214. In FIGS. 2A and 2B, the extension bar 214 is shown as coupled (via clips) to the reservoir 124. The extension bar 214 can be detached from the reservoir 124 and attached to the pump handle 212 of the lever 204 (e.g., slid onto the pump handle 212). The extension bar 214 can then be used to the move the lever 204 up and down. The extension bar 214 increases the length of the lever arm and, thus, increases the input force that a human operator can exert on the pump rod 202.

As disclosed above, the manual hydraulic override pump 100 includes the selector valve 128 (FIG. 1) to connect the various ports on the manifold 126. To control the position or state of the selector valve 128, the manual hydraulic override pump 100 includes a handwheel 216. The handwheel 216 can be rotated or turned by a human operator to select the desired position or state of the selector valve 128. The handwheel 216 is rotatable between a neutral position (corresponding to the neutral position 168 of the selector valve 128 (FIG. 1)), a first actuating position (corresponding to the first actuating position 170 of the selector valve 128 (FIG. 1)), and a second actuating position (corresponding to the second actuating position 172 of the selector valve 128 (FIG. 1)). In this example, the neutral position is between the first and second actuating positions.

In FIG. 2A, the handwheel 216 is shown in the neutral position. In the neutral position, the selector valve 128 (FIG. 1) fluidly couples the hand pump 122, the reservoir 124, the first chamber 114 (FIG. 1), and the second chamber 116 (FIG. 1). As such, the pressures in the first and second chambers 114, 116 (FIG. 1) are equalized, and pumping the hand pump 122 has no effect on the actuator 102 (FIG. 1).

To move the handwheel 216 to the first actuating position, the handwheel 216 can be rotated counter-clockwise to a first position (e.g., 45° to the left). In the first actuating position, the selector valve 128 (FIG. 1) fluidly couples the hand pump 122 and the first chamber 114 (FIG. 1) of the actuator 102 (FIG. 1), and the selector valve 128 fluidly couples the reservoir 124 and the second cylinder 116 (FIG. 1) of the actuator 102. Then, when the lever 204 of the hand pump 122 is moved up and down, hydraulic fluid is pumped from the reservoir 124, through the selector valve 128, and into the first chamber 114 of the actuator 102 to move the shaft 107 (FIG. 1) of the actuator 102 and/or otherwise enable the shaft 107 of the actuator 107 to move (e.g., via the return spring 111) in a first direction. Fluid from the second chamber 116 of the actuator 102 is pushed out of the second chamber 116 back to the reservoir 124.

To move the handwheel 216 to the second actuating position, the handwheel 216 can be rotated clockwise to a second position (e.g., 45° to the right). In the second actuating position, the selector valve 128 (FIG. 1) fluidly couples the hand pump 122 and the second chamber 116 (FIG. 1) of the actuator 102 (FIG. 1), and the selector valve 128 fluidly couples the reservoir 124 and the first chamber 114 (FIG. 1) of the actuator 102. Then, when the lever 204 of the hand pump 122 is moved up and down, hydraulic fluid is pumped from the reservoir 124, through the selector valve 128, and into the second chamber 116 of the actuator 102 to move the shaft 107 (FIG. 1) of the actuator 102 and/or otherwise enable the shaft 107 of the actuator 102 to move in a second direction opposite the first direction. Further, fluid from the first chamber 114 is pushed out of the first chamber 114 back to the reservoir 124. In some examples, a small resistance is applied to the handwheel 216 at each of the three positions to indicate to the human operator when a particular position is reached. An example detent pin that may be used to create such resistance is described in further detail in conjunction with FIG. 8.

In the illustrated example of FIGS. 2A and 2B, the manual hydraulic override pump 100 includes a tab 218 that is coupled and extends outward (e.g., downward) from the handwheel 216. The tab 218 can be used to visually indicate the position of the handwheel 216 (and, thus, the selector valve 128) to a human operator. As shown in FIG. 2A, first indicia 220 (e.g., "MANUAL CCW") and second indicia 222 (e.g., "MANUAL CW") are provided on a plate 223. In the neutral position, the tab 218 points downward between the first and second indicia 220, 222. When the handwheel 216 is rotated counter-clockwise to the first actuating position, the tab 218 points to the first indicia 220. When the handwheel 216 is rotated clockwise to the second actuating position, the tab 218 points to the second indicia 220.

In the illustrated example, the manual hydraulic override pump 100 includes a pneumatic reset cylinder 224 (e.g., an actuator) to move the handwheel 216 back to the neutral position, which is disclosed in further detail herein.

Figure 3A:
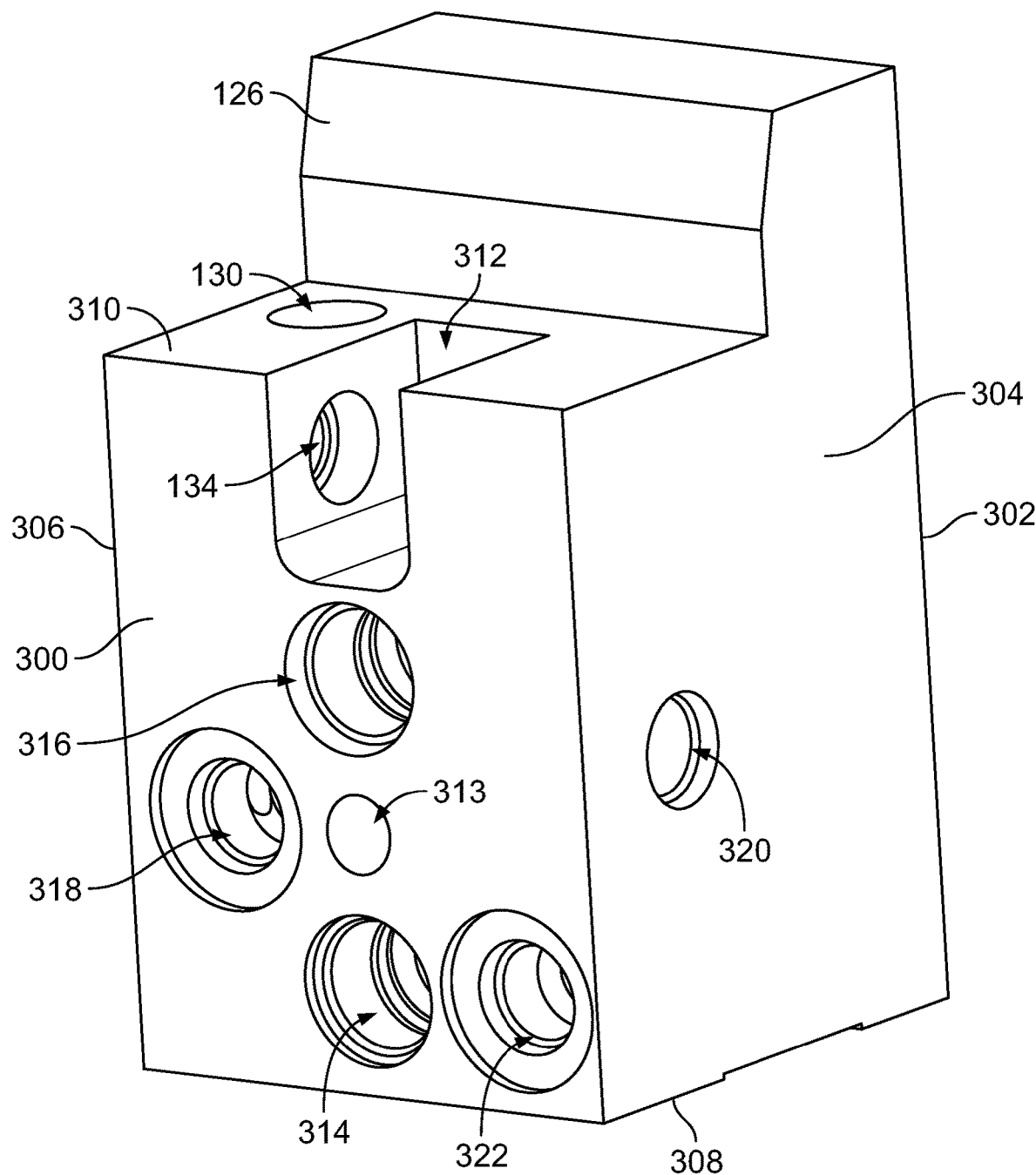
FIG. 3A is a front, top perspective view of an example manifold of the example manual hydraulic override pump of FIG. 2A.
Figure 3B:
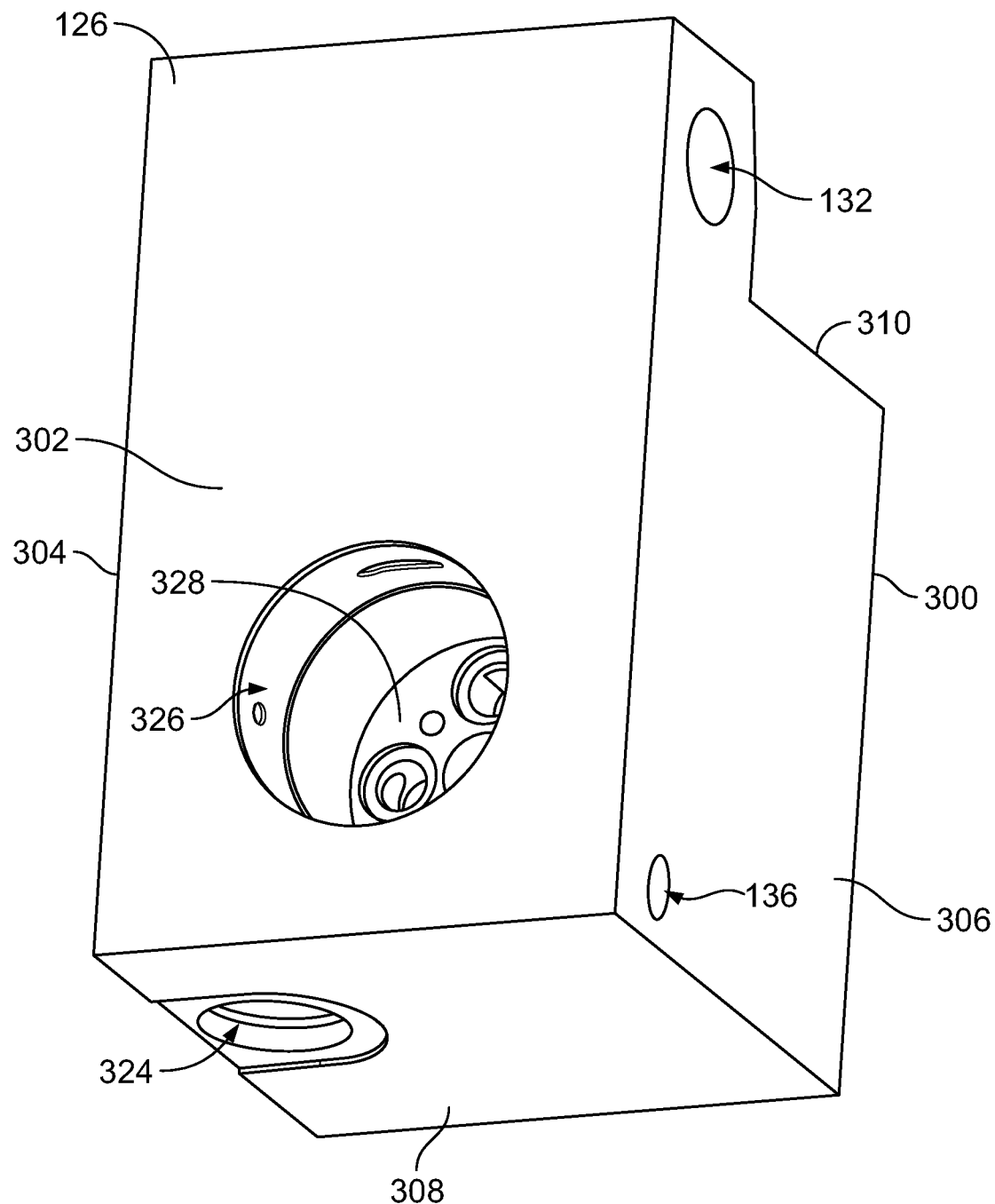
FIG. 3B is a rear, bottom perspective view of the example manifold of FIG. 3A.
Figure 3C:
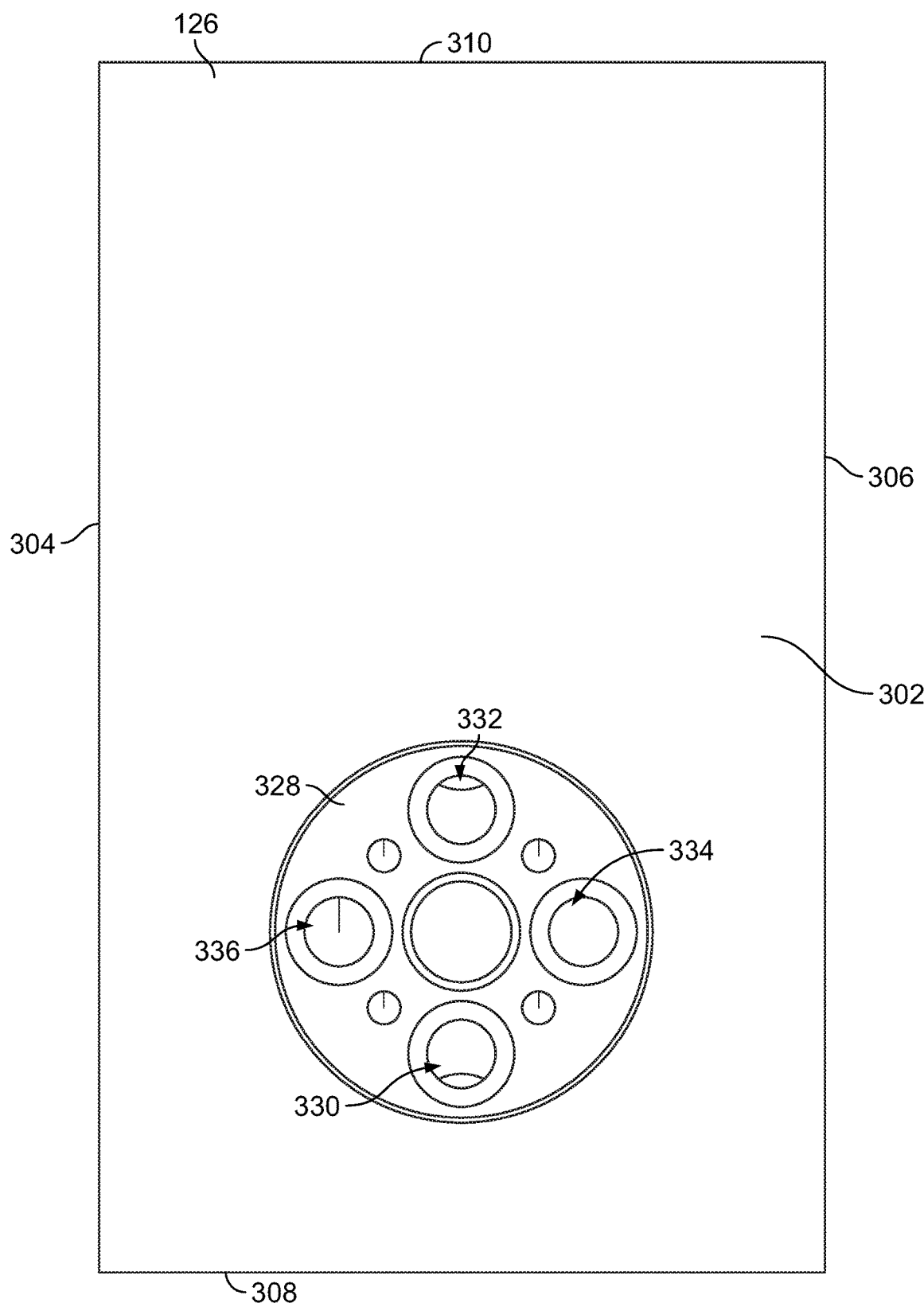
FIG. 3C is a rear view of the example manifold of FIGS. 3A and 3B.

FIG. 3A is a front, top perspective view of the example manifold 126, FIG. 3B is a rear, bottom perspective view of the example manifold 126, and FIG. 3C is a rear view of the manifold 126. The other parts of the manual hydraulic override pump 100 have been removed for clarity. As shown in FIGS. 3A-3C, the manifold 126 has a front side 300, a rear side 302 opposite the front side 300, a right side 304, a left side 306 opposite the right side 304, a bottom side 308, and a top side 310 opposite the bottom side 308. These terms are used only for differentiating the various sides of the manifold 126. These terms do not require a certain orientation of the example manifold 126.

As shown in the illustrated example of FIG. 3A, the top side 310 of the manifold 126 includes a notch 312 to receive a bottom of the pump cylinder 200 (FIGS. 2A and 2B). The pump port 134 is formed in the notch 312. The bottom of the pump cylinder 200 (FIGS. 2A and 2B) is coupled to the manifold 126 via a pin that extends into the pump port 134, shown in further detail in connection with FIG. 4. The pin includes a passageway to transfer fluid between the pump port 134 and the chamber in the pump cylinder 200. Thus, the pin forms the fluid line 142 (FIG. 1). In some examples, the pump cylinder 200 is pivotable about the pin.

As shown in FIG. 3A, the first actuating port 130 is formed in the top side 310 of the manifold 126. The first actuating port 130 is to be fluidly coupled (e.g., via the fluid line 138 (FIG. 1)) to the first chamber 114 of the actuator 102 (FIG. 1). As shown in FIG. 3B, the second actuating port 132 of the illustrated example is formed in the left side 306 of the manifold 126. The second actuating port 132 is to be fluidly coupled (e.g., via the fluid line 140 (FIG. 1)) to the second chamber 116 of the actuator 102 (FIG. 1). The reservoir port 136 of the illustrated example is formed on the left side 206 of the manifold 126. The reservoir port 136 is to be fluidly coupled (e.g., via the fluid line 144 (FIG. 1)) to the reservoir 124 (FIG. 1). The front side 300 of the manifold 216, as shown in FIG. 3A, includes an opening 313 to receive a shaft (shown in FIG. 4) that couples the handwheel 216 (FIGS. 2A and 2B) to a rotor in the manifold 216.

The manifold 126 includes a plurality of openings in which the check valves and/or orifices can be inserted. For example, as shown in FIG. 3A, an opening 314 is formed in the front side 300 of the manifold 126 to receive the first check valve and orifice 148 (FIG. 1). When the first check valve and orifice 148 is/are inserted into the opening 314, the first check valve and orifice 148 is/are disposed in the fluid line 146 (FIG. 1) between the selector valve 128 (FIG. 1) and the first actuating port 130. Another opening 316 is formed in the front side 300 of the manifold 126 to receive the second check valve and orifice 152 (FIG. 1). When the second check valve and orifice 152 is/are inserted into the opening 316, the second check valve and orifice 152 is/are disposed in the fluid line 150 (FIG. 1) between the selector valve 128 (FIG. 1) and the second actuating port 132. An opening 318 is formed in the front side 300 of the manifold 126 to receive the first check valve 156 (FIG. 1). When the first check valve 156 is inserted into the opening 318, the first check valve 156 is disposed in the fluid line 154 (FIG. 1) between the pump port 134 and the selector valve 128 (FIG. 1). An opening 320 is formed in the right side 304 of the manifold 126 to receive the second check valve 160 (FIG. 1). When the second check valve 160 is inserted into the opening 320, the second check valve 160 is disposed in the fluid line 158 (FIG. 1) between the reservoir port 136, the selector valve 128 (FIG. 1), and the pump port 134. Another opening 322 is formed in the front side 300 of the manifold 126 to receive the third check valve 166 (FIG. 1). When the third check valve 166 is inserted into the opening 322, the third check valve 166 is disposed between the fluid line 154 and the fluid line 164. As shown in FIG. 3B, an opening 324 is formed in the bottom side 308 of the manifold 126 to receive the pressure relief valve 162 (FIG. 1). In other examples, any of the ports 130, 132, 134, 136 and/or any of the openings 313, 314, 316, 318, 320, 322, 324 can be formed in other sides of the manifold 126.

As shown in FIG. 3B, a bore 326 is formed in the rear side 302 of the manifold 126. A block or plug is to be inserted into the bore 326 to define a cavity within the manifold 126. As disclosed in further detail herein, a rotor and a disk are disposed in the cavity. The rotor, the disk, and the cavity form the selector valve 128, which is implemented as a rotary valve. A wall 328 defining the bore 326 includes a plurality of openings. As shown more clearly in FIG. 3C, the wall 328 has four openings including a first opening 330 that is fluidly coupled to the fluid line 146 (FIG. 1) that connects to the first actuating port 130, a second opening 332 that is fluidly coupled to the fluid line 150 that connects to the second actuating port 132, a third opening 334 that is fluidly coupled to the fluid line 154 that connects to pump port 134, and a fourth opening 336 that is fluidly coupled to the fluid line 158 that connects to the reservoir port 136. As disclosed in further detail herein, the rotor connects various ones of the openings to form flow paths between the first actuating port 130, the second actuating port 132, the pump port 134, and the reservoir port 136.

Figure 4:
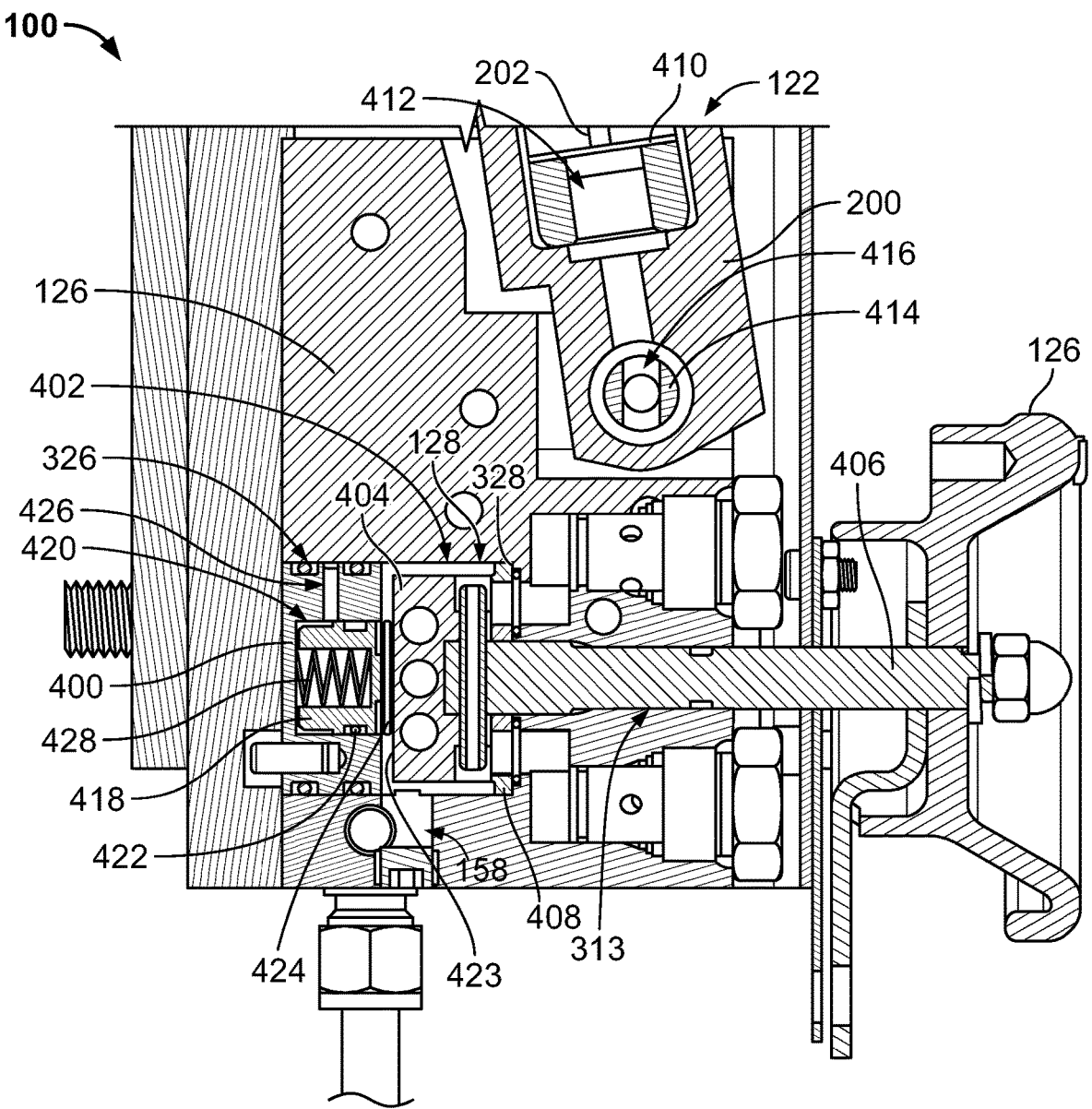
FIG. 4 is a cross-sectional view of the example manual hydraulic override pump taken along line A-A of FIG. 2A.

FIG. 4 is a cross-sectional view of the manual hydraulic override pump 100 taken along line A-A of FIG. 2A. As shown in FIG. 4, a block 400 is disposed in the bore 326, which defines a cavity 402 within the manifold 126. In the illustrated example, the manual hydraulic override pump 100 includes a rotor 404 that is disposed in the cavity 402 of the manifold 126. The rotor 404 is rotatable in the cavity 402 to fluidly connect various ones of the fluid lines and ports, as disclosed in further detail herein. The manual hydraulic override pump 100 includes a shaft 406 that is coupled to and extends from the rotor 404. The shaft 406 extends through the opening 313 in the manifold 216. The handwheel 216 is fixedly coupled to the shaft 406 (e.g., via a screw or bolt). Thus, rotation of the handwheel 216 causes rotation of the rotor 404 in the cavity 402.

In the illustrated example, the manual hydraulic override pump 100 includes a disk 408. The disk 408 is disposed in the cavity 402 and fixedly coupled to the wall 328 of the cavity 402. The disk 408 forms a sealing interface between the rotor 404 and the wall 328. As shown in further detail herein, the disk 408 includes openings that are aligned with the openings 330-336 (FIG. 3C) in the wall 328. The rotor 404 is engaged with the disk 408 and is rotatable to fluidly couple certain ones of the openings 330-336. The cavity 402, the rotor 404, and the disk 408 form the selector valve 128, which, in this example, is a rotary valve.

Also shown in FIG. 4 is the pumping cylinder 200 of the hand pump 122. The pumping cylinder 200 has a piston 410 disposed in a chamber 412 in the pumping cylinder 200. The pump rod 202 is coupled to the piston 410 to move the piston 410 up and down in the chamber 412. The pumping cylinder 200 is pivotably coupled to the manifold 126 via a pivot pin 414. The pivot pin 414 extends into the pump port 134 (FIG. 3A). The pivot pin 414 has a channel 416 that fluidly couples the chamber 412 and the pump port 134. Thus, fluid can be moved between the chamber 412 and the pump port 134. When the pump rod 202 is moved up, hydraulic fluid from the reservoir 124 is drawn into the chamber 412. When the pump rod 202 is moved down, the hydraulic fluid is pushed out of the chamber 412 toward the selector valve 128.

In some examples, to increase sealing pressure between the rotor 404 and the disk 408, the manual hydraulic override pump 100 includes means for forcing or biasing the rotor 404 into the disk 408. For example, as shown in FIG. 4, the manual hydraulic override pump 100 includes a piston 418 disposed in the manifold 126 to bias the rotor 404 into the disk 408 (to the right in FIG. 4). In the illustrated example, the piston 418 is disposed in a bore 420 formed in the block 400. The piston 418 extends outward from the bore 420 and into the cavity 402. The bore 420 is isolated from the cavity 402 by a seal 422 (e.g., an O-ring) on the piston 418. The piston 418 pushes against a back surface 423 of the rotor 404 to bias the rotor 404 into sealing engagement with the disk 408. In the illustrated example, a thrust bearing 424 is disposed between the piston 418 and the back surface 423 of the rotor 404. The thrust bearing 424 enables the rotor 404 to rotate smoothly relative to the piston 418 as the piston 418 applies pressure on the back surface 423 of the rotor 404.

To bias the piston 418 against the rotor 404, the block 400 and/or the manifold 126 includes a passageway 426 that is fluidly coupled to the fluid line 154 (FIG. 1) in the manifold 126 between the pump port 134 (FIG. 1) and the selector valve 128 (FIG. 1). Therefore, when the hand pump 122 (FIG. 1) is used to supply pressurized fluid to one of the first chamber 114 or the second chamber 116 (e.g., when the rotor 404 is in the first actuating position 170 or the second actuating position 172), the bore 420 in the block 400 is also pressurized, which forces the piston 418 into the rotor 404. In other words, the rotor 404 receives proportional feedback from the hand pump 122. As such, the higher the pressure, the better the sealing performance. This pressure on the rotor 404 helps maintains a high pressure seal between the rotor 404 and the disk 408, which is beneficial when pumping high pressure fluid through the rotor 404 and the disk 408. This type of design may be referred to as a resilient seated design. When the rotor 404 is in the neutral position 168, the pressure in the fluid line 154 (FIG. 1) is reduce. As such, the pressure in the bore 420 is also reduced. In other examples, in addition to or as an alternative to being fluidly coupled to the fluid line 154, the passageway can be fluidly coupled to another pressurized source, such as one or both of the fluid lines 146, 150 (FIG. 1). In the illustrated example of FIG. 4, a spring 428 is disposed in the bore 420 to provide an initial biasing force on the piston 418 when the pressure in the bore 420 is relatively low (e.g., when initially switching from the neutral position to one of the first or second actuating positions).

Figure 5:
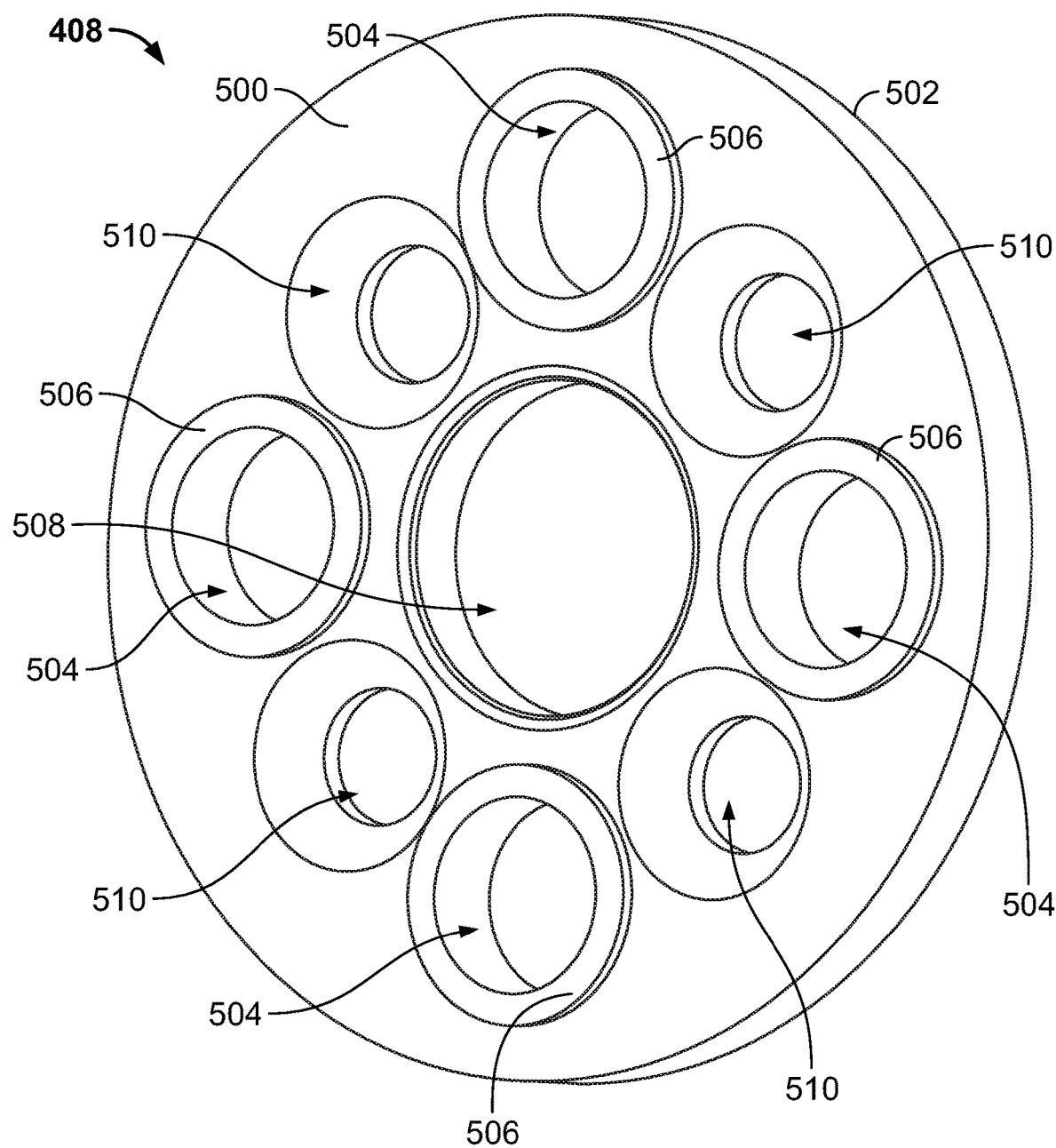
FIG. 5 is an isolated perspective view of an example disk of the example manual hydraulic override pump of FIGS. 2A and 2B.

FIG. 5 is an isolated perspective view of the disk 408. The disk 408 has a first side 500 and a second side 502 opposite the first side 500. The disk 408 is coupled to the wall 328 (FIG. 4) of the manifold 126 in the cavity 402 (FIG. 4) such that the second side 502 is in contact with the wall 328 (FIG. 4). The second side 502 is substantially flat.

In the illustrated example, the disk 408 has four openings 504, extending between the first and second sides 500, 502, that are aligned with the openings 330-336 (FIG. 3C) in the wall 328 (FIG. 3C). Thus, the openings 504 correspond to the pump port 134, the reservoir port 136, the first actuator port 130, and the second actuator port 132. In the illustrated example, the first side 500 includes annular raised ridges or rings 506 around the openings 504. The annular raised ridges 506 create a tight sealing interface between the disk 408 and the rotor 404, which is shown in further detail in FIG. 10.

In the illustrated example, the disk 408 has a central opening 508. The shaft 406 (FIG. 4) extends through the central opening 508. The disk 408 also has four fastener openings 510 to receiver fasteners (e.g., screws, bolts, etc.) for fastening the disk 408 to the manifold 126. In other examples, the disk 408 may include more or fewer fastener openings. Additionally or alternatively, the disk may be coupled to the wall 328 of the manifold 126 via other mechanical and/or chemical fastening techniques (e.g., friction fit, welding, an adhesive, etc.).

Figure 6:
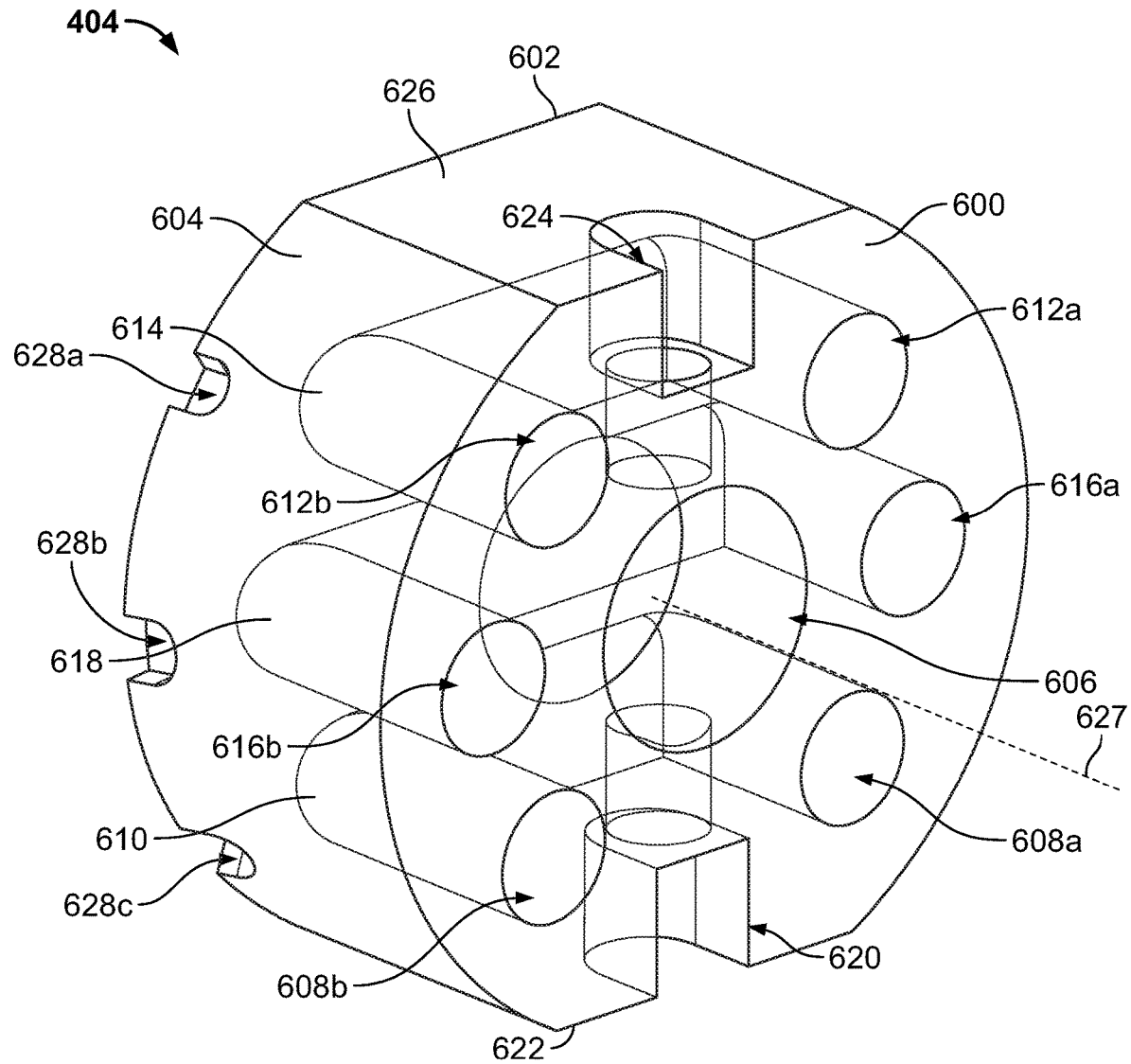
FIG. 6 is an isolated perspective view of an example rotor of the example manual hydraulic override pump of FIGS. 2A and 2B.

FIG. 6 is an isolated perspective view of the rotor 404. The body of the rotor 404 is shown as transparent in FIG. 6 to expose the internal passageways. The example rotor 404 has a sealing surface 600 (e.g., a first side or surface), the back surface 423 (e.g., a second side or surface) opposite the sealing surface 600, and an outer peripheral surface 604 between the sealing surface 600 and the back surface 423. The sealing surface 600 may also be referred to as a sealing face. The sealing surface 600 is to be engaged with the disk 408, as shown in FIG. 4. In the illustrated example, a central bore 606 is defined in the sealing surface 600 that extends partially into the rotor 404. The shaft 406 (FIG. 4) is to be inserted into the central bore 606 and coupled to the rotor 404.

In the illustrated example, the sealing surface 600 includes pairs of openings that are connected by respective passageways or channels formed in the rotor 404. In other words, the rotor 404 has passageways, each of which connects two of the openings in the sealing surface 600. For example, the sealing surface 600 in the illustrated example has a first pair of openings 608a, 608b that are connected by a first passageway 610 formed in the rotor 404, a second pair of openings 612a, 612b that are connected by a second passageway 614 formed in the rotor 404, and a third pair of openings 616a, 616b that are connected by a third passageway 618 formed in the rotor 404. The first, second, and third passageways 610, 614, 618 are isolated from each other and are parallel to each other. Depending on the orientation of the rotor 404, the first, second, and/or third pairs of openings 608a, 608b, 612a, 612b, 614a, 614b may align with the openings 504 in the disk 408 (FIG. 5) to fluidly couple corresponding ones of the openings 330-336 in the manifold 126 (FIG. 3C), as shown in further detail in connection with FIGS. 7A-7C.

In the illustrated example of FIG. 6, the rotor 404 has a first notch 620 formed in the sealing surface 600 that extends to a first flattened surface 622 on the outer peripheral surface 604. The rotor 404 also has a second notch 624 formed in the sealing surface 600 that extends to a second flattened surface 626 on the outer peripheral surface 604 opposite the first notch 620 and the first flattened surface 622. When the rotor 404 is disposed in the cavity 402, the first and second flattened surfaces 622, 626 enable the first and second notches 620, 624 to be in fluid communication via the cavity 402. The rotor 404 may be rotated to align certain ones of the openings 330-336 (FIG. 3C) with the notches 620, 624 to fluidly connect certain ones of the openings 330-336 via the cavity 402. The first, second, and third pairs of openings 608a, 608b, 612a, 612b, 616a, 616b and the first and second notches 620, 624 are equally spaced from a central axis 627 of the rotor 404.

In the illustrated example, the rotor 404 has first, second, and third detent grooves 628a, 628b, 628c formed in the outer peripheral surface 604. The first, second, and third detent grooves 628a, 628b, 628c are arranged to receive a detent pin to hold the rotor 404 in a specific position, as shown in further detail in conjunction with FIG. 8.

Figure 7:
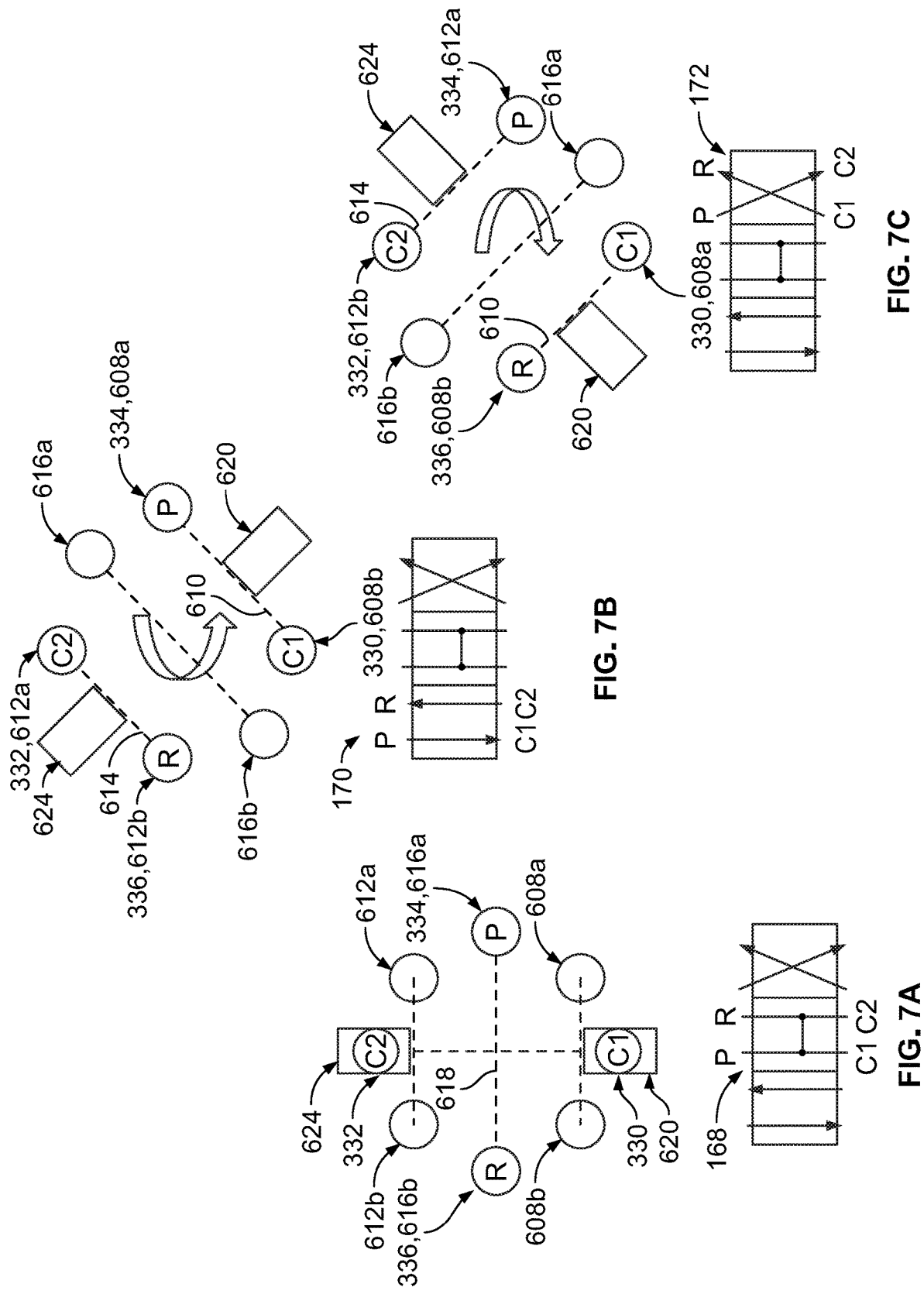
FIG. 7A shows an example alignment of openings and notches of the example rotor of FIG. 6 with openings in the example manifold shown in FIG. 3C when the example rotor is in a neutral position.
FIG. 7B shows an example alignment of openings and notches of the example rotor of FIG. 6 with openings in the example manifold shown in FIG. 3C when the example rotor is in a first actuating position.
FIG. 7C shows an example alignment of openings and notches of the example rotor of FIG. 6 with openings in the example manifold shown in FIG. 3C when the example rotor is in a second actuating position.

FIG. 7A shows the alignment between the pairs of openings 608a, 608b, 612a, 612b, 616a, 616b and the notches 620, 624 in the rotor 404 (FIG. 6) with the openings 330-336 in the manifold 126 (FIG. 3C) when the rotor 404 is in the neutral position 168. In the neutral position 168, the first notch 620 is aligned with the first opening 330 (corresponding to the first actuating port 130 for the first chamber 114 (FIG. 1), labeled "C1"). As such, the first actuating port 130 (FIG. 1) is in fluid communication with the cavity 402 (FIG. 4). Similarly, the second notch 624 is aligned with the second opening 332 (corresponding to the second actuator port 132 for the second chamber 116 (FIG. 1), labeled "C2"). Therefore, the second actuating port 132 (FIG. 1) is also in fluid communication with the cavity 402 (FIG. 4). Thus, when the rotor 404 is in the neutral position 168, the first and second actuating ports 130, 132 (FIG. 1) are fluidly coupled by the cavity 402 (FIG. 4). As such, the pressures in first and second chambers 114, 116 of the hydraulic override cylinder 112 (FIG. 1) are equalized.

Further, as shown in FIG. 7A, the third pair of openings 616a, 616b in the rotor 404 are aligned with the third opening 334 (corresponding to the pump port 134 for the hand pump 122 (FIG. 1), labeled "P") and the fourth opening 336 (corresponding to the reservoir port 136 for the reservoir 124 (FIG. 1), labeled "R"), respectively. Therefore, when the rotor 404 is in the neutral position 168, the third passageway 618 fluidly couples the pump port 134 and the reservoir port 136 and, thus, fluidly couples the hand pump 122 and the reservoir 124. As such, pumping the hand pump 122 does not have any effect on the first or second chambers 114, 116 (FIG. 1). Further, as shown in FIG. 4, a portion of the fluid line 158 is fluidly coupled to the cavity 402. Therefore, in the neutral position, the first and second actuator ports 130, 132 (FIGS. 3A and 3B) are also fluidly coupled to the reservoir port 136 (FIG. 3B) and, thus, the pump port 134 (FIG. 3A). Therefore, all of the ports are fluidly coupled and the fluid pressure in fluid lines is equalized. In the neutral position, the first and second pairs of openings 608a, 608b, 612a, 612b are not aligned with any openings.

FIG. 7B shows the alignment between the pairs of openings 608a, 608b, 612a, 612b, 616a, 616b and the notches 620, 624 in the rotor 404 (FIG. 6) with the openings 330-336 in the manifold 126 (FIG. 3C) when the rotor 404 is in the first actuation position 170. As shown in FIG. 7B, the rotor 404 has been rotated (e.g., via the handwheel 216 (FIG. 2A)) counter-clockwise 45° from the neutral position 168 in FIG. 7A. In the first actuating position 170, the first pair of openings 608a, 608b is aligned with the third opening 334 (corresponding to the pump port 134 for the hand pump 122 (FIG. 1), labeled "P") and the first opening 330 (corresponding to the first actuating port 130 for the first chamber 114 (FIG. 1), labeled "C1"), respectively. Thus, when the rotor 404 is in the first actuating position 170, the first passageway 610 fluidly couples the pump port 134 and the first actuating port 130. As a result, hydraulic fluid can be pumped from the hand pump 122 into the first chamber 114 of the actuator 102.

Further, in the first actuating position 170, the second pair of openings 612a, 612b is aligned with the second opening 332 (corresponding to the second actuator port 132 for the second chamber 116 (FIG. 1), labeled "C2") and the fourth opening 336 (corresponding to the reservoir port 136 for the reservoir 124 (FIG. 1), labeled "R"), respectively. Thus, when the rotor 404 is in the first actuating position 170, the second passageway 614 fluidly couples the second actuating port 132 and the reservoir port 136. As a result, hydraulic fluid from the second chamber 116 of the actuator 102 can be pushed back into the reservoir 124 as the piston 118 of the hydraulic override cylinder 112 moves.

FIG. 7C shows the alignment between the pairs of openings 608a, 608b, 612a, 612b, 616a, 616b and the notches 620, 624 in the rotor 404 (FIG. 6) with the openings 330-336 in the manifold 126 (FIG. 3C) when the rotor 404 is in the second actuating position 172. As shown in FIG. 7C, the rotor 404 has been rotated (e.g., via the handwheel 216 (FIG. 2A)) clockwise 45° from the neutral position 168 in FIG. 7A. In the second actuating position 172, the second pair of openings 612a, 612b is aligned with the third opening 334 (corresponding to the pump port 134 for the hand pump 122 (FIG. 1), labeled "P") and the second opening 332 (corresponding to the second actuator port 132 for the second chamber 116 (FIG. 1), labeled "C2"), respectively. Thus, when the rotor 404 is in the second actuating position 172, the second passageway 614 fluidly couples the pump port 134 and the second actuating port 132. As a result, hydraulic fluid can be pumped from the hand pump 122 into the second chamber 116 of the actuator 102.

Further, in the second actuating position 172, the first pair of openings 608a, 608b is aligned with the first opening 330 (corresponding to the first actuating port 130 for the first chamber 114 (FIG. 1), labeled "C1") and the fourth opening 336 (corresponding to the reservoir port 136 for the reservoir 124 (FIG. 1), labeled "R"), respectively. Thus, when the rotor 404 is in the second actuating position 172, the first passageway 610 fluidly couples the first actuating port 130 and the reservoir port 136. As a result, hydraulic fluid from the first chamber 114 of the actuator 102 can be pushed back into the reservoir 124 as the piston 118 of the hydraulic override cylinder 112 moves.

Figure 8:
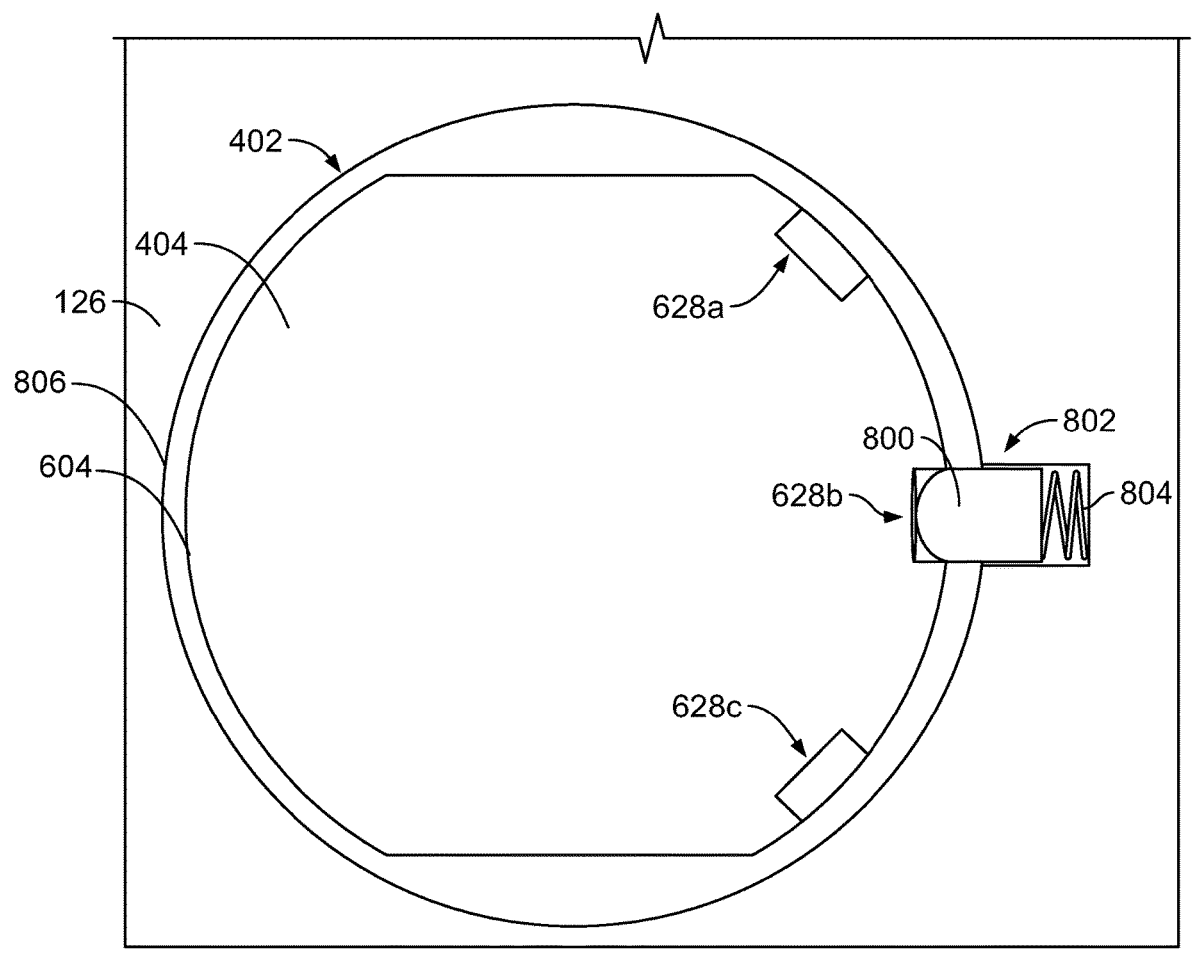
FIG. 8 is a rear view of the example rotor of FIG. 6 in the example manifold of FIGS. 3A-3C.

FIG. 8 is a rear view of the rotor 404 in the cavity 402 of the manifold 126. As shown in FIG. 8, a detent pin 800 is disposed in a bore 802 formed in the manifold 126. A spring 804 is disposed in the bore 802 and biases the detent pin 800 toward the rotor 404. In the illustrated example, the detent pin 800 is settled in the second detent groove 628b of the rotor 404, which corresponds to the neutral position of the rotor 404. The detent pin 800 holds the rotor 404 in the neutral position until a sufficient rotational force is applied to rotate the rotor 404. When the rotor 404 is rotated, the detent pin 800 is pushed back into the bore 802. When the rotor 404 reaches one of the first or third detent grooves 628a, 628c (which correspond to the first actuating position and the second actuating position, respectively), the detent pin 800 settles into the corresponding detent groove to hold the rotor 404. This resistance provides a haptic feeling or feedback to the human operator to indicate when a corresponding position has been reached. In the illustrated example, the outer peripheral surface 604 of the rotor 404 is spaced apart from an inner sidewall 806 defining of the cavity 402. In other examples, the diameter of the rotor 404 may be larger, such that the outer peripheral surface 604 of the rotor 404 is closer to the inner sidewall 806 of the cavity 402 and/or in contact with (e.g., slides along) the inner sidewall 806 of the cavity 402.

Figure 9:
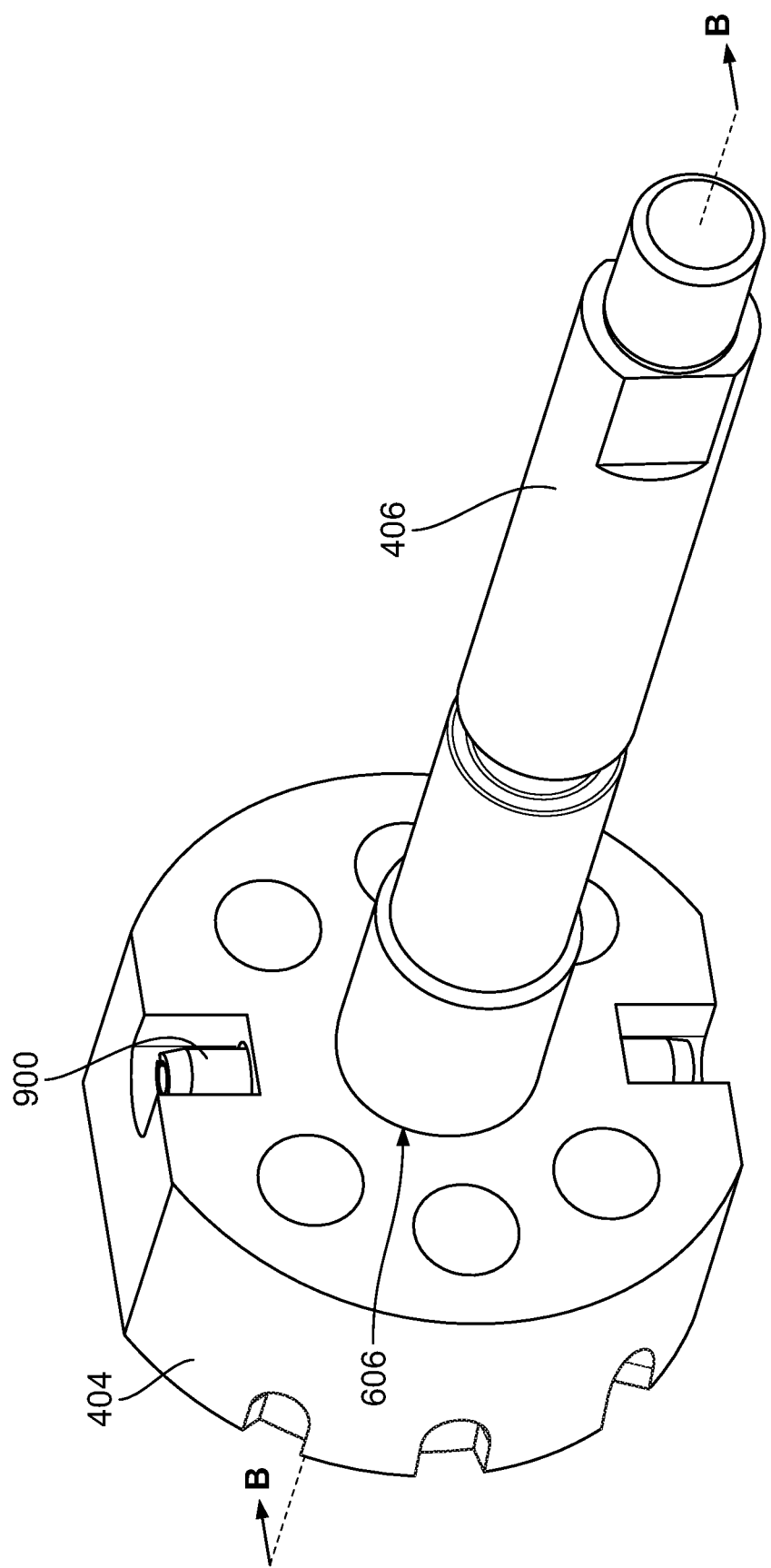
FIG. 9 is a perspective view of the example rotor of FIG. 6 and an example shaft of the example manual hydraulic override pump of FIGS. 2A and 2B.

FIG. 9 is a perspective view of the rotor 404 and the shaft 406. The shaft 406 is coupled to and extends from the rotor 404 (e.g., along a central axis of the rotor 404). As shown in FIG. 9, the shaft 406 is partially disposed in the central bore 606 in the rotor 404. To couple the rotor 404 and the shaft 406, a spring pin 900 (which may be referred to as a roll pin) extends through the rotor 404 and the shaft 406. As such, the shaft 406 can rotate the rotor 404.

Figure 10:
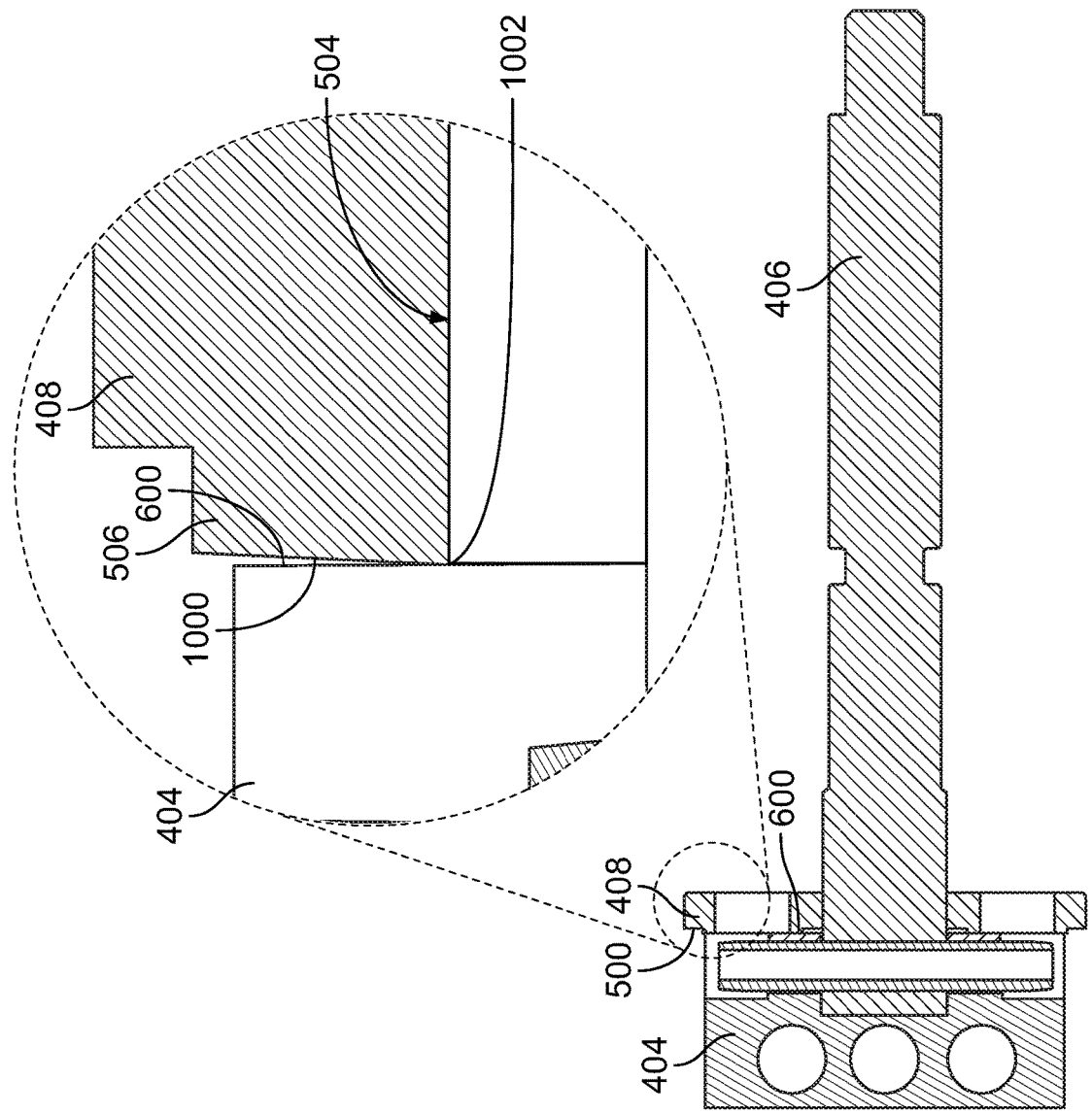
FIG. 10 is a cross-sectional view of the example rotor and shaft taken along line B-B of FIG. 9 and the example disk of FIG. 5. An enlarged view of the cross-section is shown in the callout.

FIG. 10 is a cross-sectional view of the rotor 404 and the shaft 406 taken along line B-B of FIG. 9. FIG. 10 also illustrates the sealing interface between the rotor 404 and the disk 408. The sealing surface 600 of the rotor 404 is in contact with the disk 408. An enlarged view of the encircled section in FIG. 10 is shown in the callout.

In some examples, to provide a tight sealing interface between the disk 408 and the sealing surface 600 of the rotor 404, the outer surfaces of the annular raised ridges 506 are convex or bowed outward toward the sealing surface 600 of the rotor 404. For example, as shown in the callout in FIG. 10, a sealing surface 1000 of the annular raised ridge 506 is convex toward the opening 504. This creates a single line of contact (at point 1002), in a circle, between the sealing surfaces 600, 1000 immediately around the opening 504. This line of contact ensures a full, complete engagement between the sealing surfaces 600, 1000 to achieve maximum sealing performance and prevent leakage. Further, the convex profile reduces or eliminates trapped air between the rotor 404 and the disk 408 that could cause vacuum trapping and that would require more force to rotate the rotor 404 out of a position. Thus, the convex profile minimizes pressure drop to achieve the highest flow performance. The other annular raised ridges 506 are similarly convex shaped and form a line of contact around the respective openings 504.

While in the illustrated example the first side 500 of the disk 408 includes the annular raised ridges 506, in other examples, no annular raised ridges are formed around the openings 504. Instead, the first side 502 of the disk 408 may be substantially flat or smooth. In some such examples, small convex features (e.g., bumps) may be formed around each of the openings 504 to create the lines of contact around each of the openings 504.

In some examples, both the rotor 404 and the disk 408 are constructed of a hard metal, such as tungsten carbide. The metal-to-metal contact between the rotor 404 and the disk 408 creates an excellent seal with minimal (if any) wear. Tungsten carbide, for example, provides high resistance to erosion, wear, abrasion, and galling where the porosity is non-existent. Thus, the example metal-to-metal seal has better sealing performance and a longer life span than known override pumps that utilize rubber seals. In some examples, the rotor 404 is constructed of a single unitary part or component (e.g., a single piece of tungsten carbide). For example, the rotor 404 may be constructed of two more pieces of tungsten carbide that are sintered together during a sintering operation to form a single part or component of tungsten carbide. In another example, the rotor 404 may be constructed of a single piece of tungsten carbide (e.g., molded in the shape of the rotor 400) and cross-holes may be drilled in the rotor 404. Then, the ends of the cross-holes can be plugged, and the resulting passageways form the passageways 610, 614, 618. Similarly, in some examples, the disk 408 is constructed of a single unitary part or component (e.g., a single piece of tungsten carbide). The rotor 404 and/or the disk 408 may be manufactured utilizing a powered metal sintering process. In other examples, the rotor 404 and/or the disk 408 may be constructed of other materials (e.g., stainless steel) and/or constructed of two or more parts or components coupled together. In other examples, the rotor 404 and/or the disk 408 may be manufactured using other manufacturing process, such as additive manufacturing (e.g., 3D printing).

In some examples the sealing surface 600 of the rotor 404 and the sealing surface 1000 of the annular raised ridges 506 of the disk 408 are polished to a mirror finish (e.g., via a grinding or polishing process, using a PDC bit with industrial diamond, etc.). As such, the sealing surfaces 600, 1000 are extremely smooth and provide excellent sealing contact between the rotor 404 and the disk 408. Further, by having the annular raised ridges 506, less surface area of the disk 408 has to be polished, which reduces manufacturing time and costs.

While in some examples the manual hydraulic override pump 100 includes the disk 408 to form the sealing interface between the rotor 404 and the wall 328 in the manifold 126, in other examples, the disk 408 may not be included. Instead, the rotor 404 may interface directly with (e.g., contact) the wall 328 of the manifold 126. In some such examples, raised and/or convex features may be formed around the openings 330-336 in the wall, similar to the annular raised ridges 506 on the disk 408.

Figure 11:
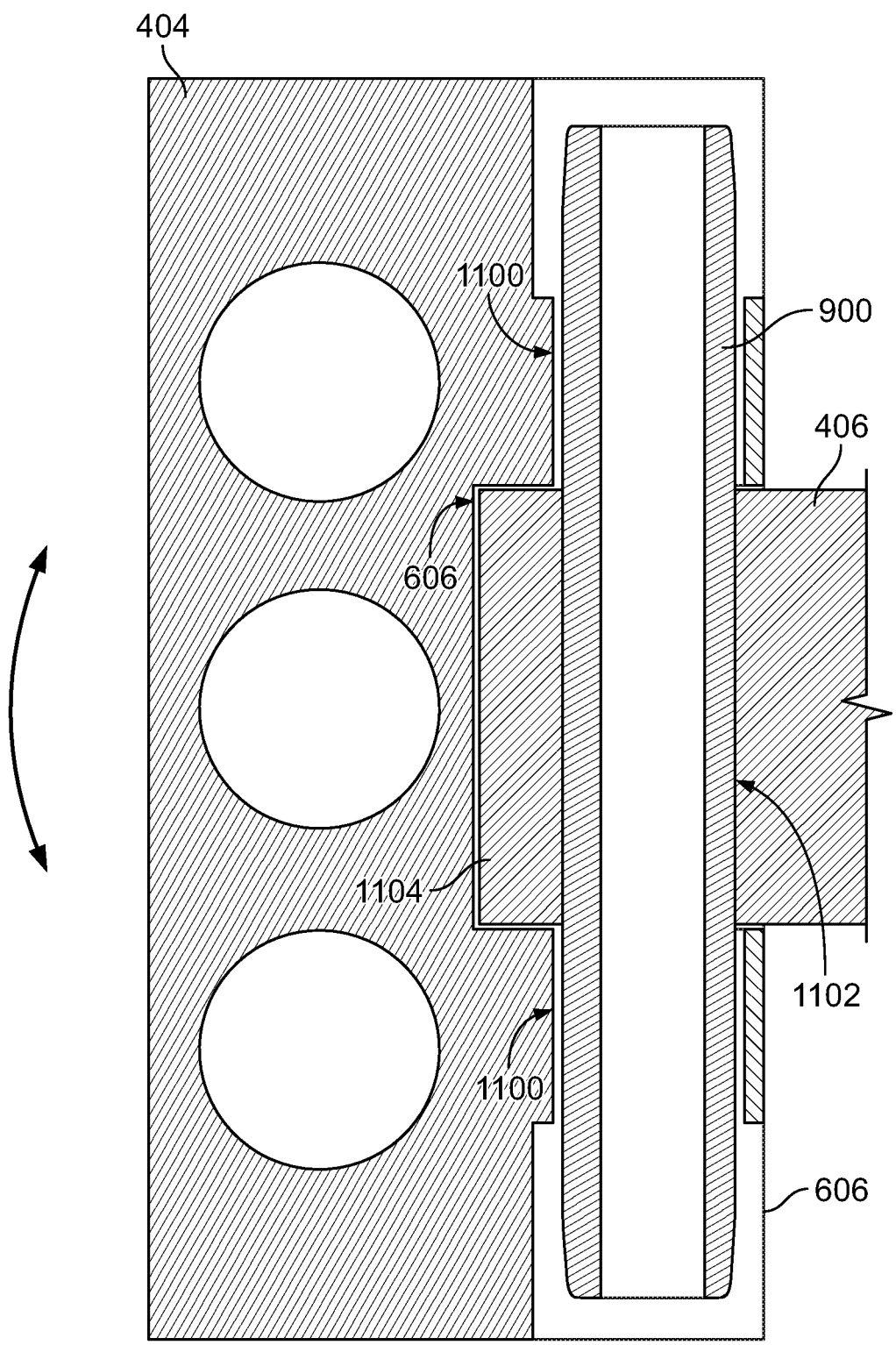
FIG. 11 is an enlarged view of the cross-section of the example rotor and the example shaft in FIG. 10.

FIG. 11 is an enlarged cross-sectional view of the rotor 404, the shaft 406, and the spring pin 900 that couples the rotor 404 and the shaft 406. As shown in FIG. 11, the spring pin 900 extends through an opening 1100 in the rotor 404 (that traverses the central bore 606) and an opening 1102 in the shaft 406 aligned with the opening 1100 in the rotor 404. To assemble the shaft 406 and the rotor 404, an end 1104 of the shaft 406 is inserted into the central bore 606 of the rotor 404. The openings 1100, 1102 are aligned. Then, the spring pin 900 is inserted through the openings 1100, 1102. In some examples, the spring pin 900 is held in the opening 1102 of the shaft 406 via interference fit (e.g., friction fit). For example, the diameter of the opening 1102 of the shaft 406 is slightly smaller than the outer diameter of the spring pin 900. As a result, the spring pin 900 is compressed when being inserted into the opening 1102 of the shaft 406 and expands into the sides of the opening 1102 of the shaft 406. The friction between the spring pin 900 and the opening 1102 of the shaft 406 holds the spring pin 900 in place. In some examples, the spring pin 900 has a c-shaped cross-section.

As disclosed above, in some examples the rotor 404 is constructed of a relatively hard material such as tungsten carbide. While extremely hard, tungsten carbide is brittle or fragile under impact forces. Therefore, to reduce the risk of compromising (e.g., cracking) the rotor 404 when inserting the spring pin 900 into the opening 1100 of the rotor 404, the diameter of the opening 1100 in the rotor 404 is larger than the outer diameter of the spring pin 900. As such, any impact forces that may be applied to the spring pin 900 when inserting the spring pin 900 (e.g., by hammering the spring pin 900 into the opening 1102) are not transferred directly to the rotor 404.

As disclosed above, a clearance exists between the spring pin 900 and the opening 1100 in the rotor 404. As a result, the rotor 404 can pivot relative to the shaft 406 about an axis (e.g., extending out of the page) that is perpendicular to a longitudinal axis of the shaft 406. For example, the rotor 404 can pivot in the direction of the arrows shown in FIG. 10. As such, if the shaft 406 is not perfectly centered in the central bore 606, the clearance enables the rotor 404 to pivot or twist relative to the shaft 406 so that the sealing surface 600 of the rotor 404 settles flat or parallel to the disk 408 (FIG. 4). This clearance ensures a tight sealing interface between the rotor 404 and the disk 408. This clearance also allows for lower manufacturing tolerances, which reduces manufacturing time and costs. In some examples, the spring pin 900 is constructed of stainless steel. In other examples, the spring pin 900 can be constructed of other materials.

In some examples, the manual hydraulic override pump 100 includes means for automatically moving the handwheel 216 back to the neutral position. For example, as shown in FIGS. 2A and 2B, the manual hydraulic override pump 100 includes the pneumatic reset cylinder 224. A top 226 of the pneumatic reset cylinder 224 is coupled to a bracket 228 that is coupled to the manifold 126.

Figure 12:
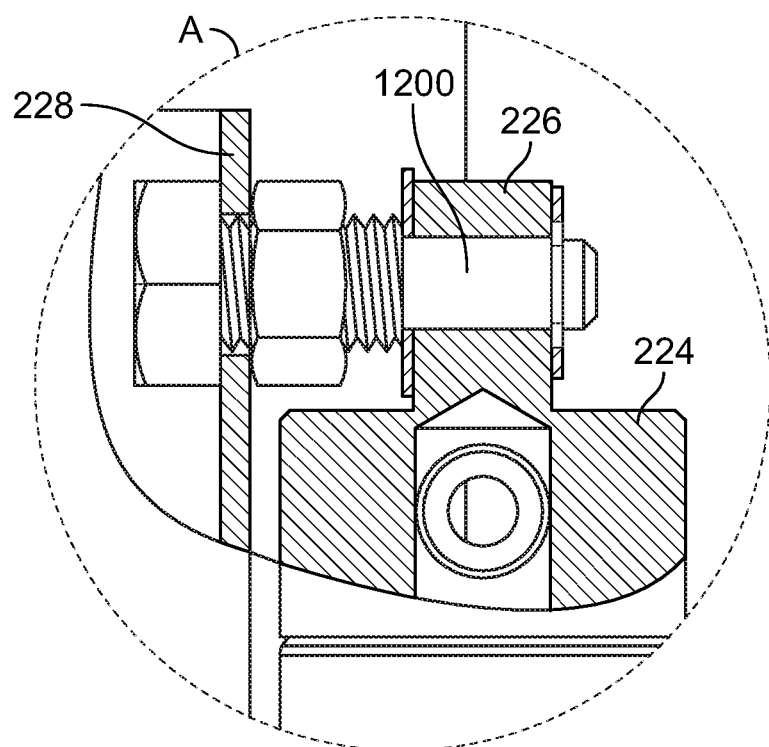
FIG. 12 is an enlarged cross-sectional view of the callout A in FIG. 2B.

FIG. 12 is a partial cross-sectional view of the top 226 of the pneumatic reset cylinder 224 from callout A of FIG. 2B. As shown in FIG. 12, the top 226 of the pneumatic reset cylinder 224 is pivotably coupled to the bracket 228 via a pin 1200 that is coupled to and extends from the bracket 228. As such, the top 226 of the pneumatic reset cylinder 224 can pivot about the pin 1200.

Figure 13:
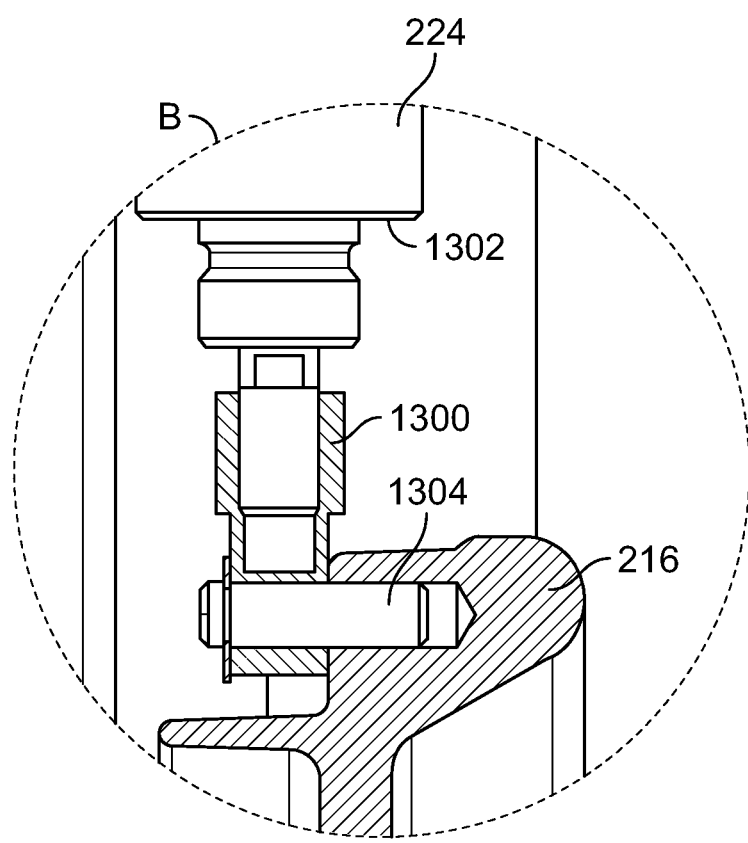
FIG. 13 is an enlarged cross-sectional view of the callout B in FIG. 2B.

FIG. 13 is a partial cross-sectional view of a bottom of the pneumatic reset cylinder 224 from callout B of FIG. 2B. As shown in FIG. 13, a shaft 1300 extends from a bottom 1302 of the pneumatic reset cylinder 224. The shaft 1300 is connected to a piston within the pneumatic reset cylinder 224. A pivot pin 1304 is coupled to and extends outward from the shaft 1300 and into the handwheel 216. When a human operator rotates the handwheel 216 to the first actuating position (counter-clockwise) or the second actuating position (clockwise), the piston shaft 1300 is extended or pulled out of the bottom 1302 of the pneumatic reset cylinder 224. Additionally, the pneumatic reset cylinder 224 pivots about the pivot pin 1200.

Figure 14:
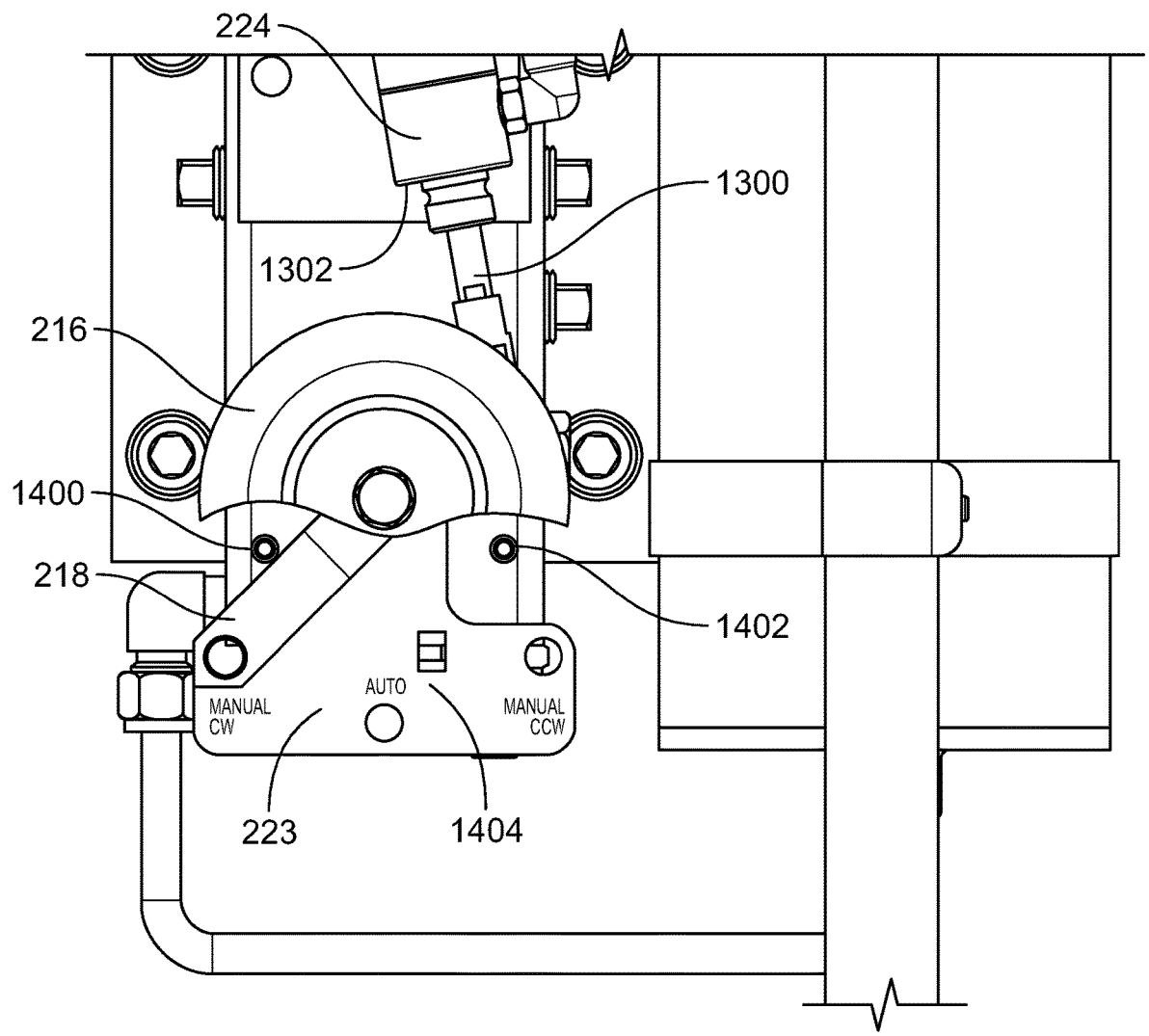
FIG. 14 shows an example handwheel of the example manual hydraulic override pump of FIG. 2A as rotated in the clockwise direction.

For example, FIG. 14 shows the handwheel 216 after being rotated (clockwise) to the first actuating position. As shown, the shaft 1300 has been pulled from the bottom 1302 of the pneumatic reset cylinder 224. The pneumatic reset cylinder 224 has also pivoted (about the pivot pin 1200 (FIG. 12)). The handwheel 216 has been cross-sectioned in FIG. 14 to expose example first and second stop pins 1400, 1402 that extend from the plate 223 or another structure (e.g., the manifold 126 (FIG. 2A)). The tab 218 on the handwheel 216 engages the second stop pin 1402 when the handwheel 216 is rotated to the first actuating position (counter-clockwise), and the tab 218 on the handwheel 216 engages the first stop pin 1400 when the handwheel 216 is rotated to the second actuating position (clockwise). The first and second stop pins 1400, 1402 form limits that prevent the handwheel 216 (and, thus, the rotor 404) from being rotated beyond the first and second actuating positions. In other examples stop pins or other tabs or structures can be employed inside of the manifold 126 to limit movement. In the illustrated example, third indicia 1404 (e.g., "AUTO") is provided on the plate 223 to indicate with the handwheel 216 is in the neutral position.

When the pneumatic reset cylinder 224 is actuated, the piston shaft 1300 is retracted or pulled back into the pneumatic reset cylinder 224. This force overcomes the force from the detent pin 800 (FIG. 8) and causes the handwheel 216 to rotate back to the neutral position. As such, the handwheel 216 is rotated back to the neutral position and the pneumatic reset cylinder 224 is pivoted back to the vertical position shown in FIGS. 2A and 2B. The pneumatic reset cylinder 224 may be actuated by receiving high pressure air provided by an air source (e.g., a compressed air tank). As shown in FIG. 2A, a tube 234 is coupled to the pneumatic reset cylinder 224 to provide high pressure air to the pneumatic reset cylinder 224. The pneumatic reset cylinder 224 may be actuated remotely, for example, via a control signal from a control room. In other examples, other types of devices may be used, such as a hydraulic powered device or an electrical powered device (e.g., an electro-mechanical solenoid). In some examples, an additional device may be used to retract the detent pin 800 (FIG. 8) from the respective detent groove 628a-628c (FIG. 8) to reduce the force required by the pneumatic reset cylinder 224 to rotate the handwheel 216 back to the neutral position.

As an example operation, assume the pump 109 for the actuator 102 has become inoperable and a human operator desires to move the flow control member 106 of the valve 104 to a specific position (e.g., fully closed, fully open, etc.). The operator can turn the handwheel 216 of the example manual hydraulic override pump 100 from the neutral position to the first actuating position or the second actuating position. Then, the human operator can use the lever 204 of the hand pump 122 to pump fluid to the actuator 102 to move the flow control member of the valve 106 to the desired position. Once the desired position of the flow control member 106 is reached, the operator can then leave the handwheel 216 (and, thus, the selector valve 128) in the current state. Then, at a later time, assume the pump 109 becomes operational again. The operator or another person can send a signal from a remote location (e.g., a control room) to activate the pneumatic reset cylinder 224, which moves the handwheel 216 (and, thus, the selector valve 128) back to the neutral position. Thus, the pneumatic reset cylinder 224 enables remote resetting of the handwheel 216 so that an operator does not have to manually turn the handwheel 216 back to the neutral position.

In other examples, the manual hydraulic override pump 100 may not include a mechanism or means for automatically moving the handwheel 216 back to the neutral position. In such an example, the human operator manually rotates the handwheel 216 back to the neutral position.

While in the illustrated examples the rotor 404 is used to fluidly couple the four openings 330-336 in the wall 328 of the manifold 126 (FIG. 3C), in other examples, the rotor 404 can be used to fluidly couple more (e.g., five, six, etc.) or fewer openings or fluid lines. For example, the wall 328 may have eight openings, and the rotor 404 may have more or fewer pairs of openings connected by passageways to connect the various openings. Also, while in the illustrated example the rotor 404 is movable between three positions, in other examples, the rotor 404 can be moveable to more or fewer positions.

Further, while the example hydraulic override pump 100 is described in connection with an actuator for a valve, it is understood that the example hydraulic override pump 100 can similarly be used in connection with any other type of device, such as a pressure regulator, a metering valve, and/or any other device controlled by an actuator.

From the foregoing, it will be appreciated that example apparatus and articles of manufacture have been disclosed that enable the design of a smaller, more compact selector valve of a manual hydraulic override pump. As such, the example manual hydraulic override pumps can be used in more applications with limited space. The example selector valves also utilize fewer components or parts than known selector valves, which reduces manufacturing costs and assembly time. Further, the example selector valves utilize metal-to-metal sealing interfaces, which create a superior sealing interface compared to the rubber seals in known selector valves.

The following paragraphs provide various examples and combinations of the examples disclosed herein.

Example 1 includes an apparatus comprising a manifold including: a reservoir port to be fluidly coupled to a reservoir of fluid; a pump port to be fluidly coupled to a pump; a first actuator port to be fluidly coupled to a first chamber of an actuator; and a second actuator port to be fluidly coupled to a second chamber of the actuator. The apparatus also comprises a rotor disposed in a cavity formed in the manifold. The rotor rotatable is rotatable between: a first actuating position in which the rotor fluidly couples the first actuator port and the pump port, and the rotor fluidly couples the second actuator port and the reservoir port; and a second actuating position in which the rotor fluidly couples the second actuator port and the pump port, and the rotor fluidly couples the first actuator port and the reservoir port.

Example 2 includes the apparatus of Example 1, wherein the rotor has a sealing surface with a first pair of openings connected by a first passageway formed in the rotor and a second pair of openings connected by a second passageway formed in the rotor.

Example 3 includes the apparatus of Example 2, wherein, when the rotor is in the first actuating position, the first passageway fluidly couples the first actuator port and the pump port, and the second passageway fluidly couples the second actuator port and the reservoir port.

Example 4 includes the apparatus of Example 3, wherein, when the rotor is in the second actuating position, the second passageway fluidly couples the second actuator port and the pump port, and the first passageway fluidly couples the first actuator port and the reservoir port.

Example 5 includes the apparatus of Example 4, wherein the rotor is rotatable to a neutral position in which the first actuator port and the second actuator port are fluidly coupled via the cavity in which the rotor is disposed.

Example 6 includes the apparatus of Example 5, wherein the sealing surface of the rotor further includes a third pair of openings connected by a third passageway formed in the rotor, and wherein, when the rotor is in the neutral position, the third passageway fluidly couples the pump port and the reservoir port.

Example 7 includes the apparatus of Example 6, wherein the first, second, and third passageways are parallel to each other.

Example 8 includes the apparatus of any of Examples 2-7, further including a disk disposed within the cavity and fixedly coupled to a wall of the cavity. The sealing surface of the rotor is engaged with the disk. The disk has openings corresponding to the pump port, the reservoir port, the first actuator port, and the second actuator port.

Example 9 includes the apparatus of claim 8, wherein the disk has annular raised ridges around the openings in the disk.

Example 10 includes the apparatus of Example 9, wherein the rotor and the disk are constructed of tungsten carbide.

Example 11 includes the apparatus of any of Examples 8-10, further including a piston disposed in the manifold. The piston is to bias the rotor into the disk.

Example 12 includes the apparatus of any of Examples 1-11, further including a shaft coupled to and extending from the rotor. The rotor and the shaft are coupled via a spring pin that enables the rotor to pivot relative to the shaft.

Example 13 includes the apparatus of any of Examples 1-12, further including a handwheel coupled to the rotor by a shaft.

Example 14 includes an apparatus comprising: a hand pump; a reservoir; a manifold having flow paths to fluidly connect to the hand pump, the reservoir, and first and second chambers of an actuator; and a handwheel rotatably coupled to the manifold to be rotated by a human operator. The handwheel is rotatable to: a first actuating position to enable the hand pump to supply hydraulic fluid from the reservoir to the first chamber to move a shaft of the actuator in a first direction; and a second actuating position to enable the hand pump to supply hydraulic fluid from the reservoir to the second chamber to move the shaft of the actuator in a second direction opposite the first direction.

Example 15 includes the apparatus of Example 14, wherein the handwheel is rotatable to a neutral position in which the first and second chambers of the actuator are fluidly coupled.

Example 16 includes the apparatus of Example 15, further including a pneumatic reset cylinder to, when actuated, rotate the handwheel from the first actuating position or the second actuating position to the neutral position.

Example 17 includes the apparatus of Examples 15 or 16, wherein the neutral position is between the first and second actuating positions.

Example 18 includes an apparatus comprising: a manifold including: a first port to be fluidly coupled to a first chamber of an actuator; a second port to be fluidly coupled to a second chamber of the actuator; a third port to be fluidly coupled to a hand pump; and a fourth port to be fluidly coupled to a reservoir. The apparatus also comprises a selector valve including a rotor disposed in a cavity of the manifold. The rotor has pairs of openings connected by respective passageways formed in the rotor. The rotor is rotatable in the cavity to align the pairs of openings with certain openings in a wall in the cavity that are fluidly coupled to the first, second, third, and fourth ports.

Example 19 includes the apparatus of Example 18, wherein the selector valve further includes a disk fixedly coupled to the wall in the cavity of the manifold. The disk has disk openings aligned with the openings in the wall of the cavity that are fluidly coupled to the first, second, third, and fourth ports.

Example 20 includes the apparatus of Examples 18 or 19, further including: a shaft coupled to the rotor and extending outward from the manifold; and a handwheel coupled to the shaft such that rotation of the handwheel causes rotation of the rotor in the cavity.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    a manifold including:
        a reservoir port to be fluidly coupled to a reservoir of fluid;
        a pump port to be fluidly coupled to a pump;
        a first actuator port to be fluidly coupled to a first chamber of an actuator; and
        a second actuator port to be fluidly coupled to a second chamber of the actuator;
    a rotor disposed in a cavity formed in the manifold, the rotor having a sealing surface with a first pair of openings connected by a first passageway formed in the rotor and a second pair of openings connected by a second passageway formed in the rotor, the rotor rotatable between:
        a first actuating position in which the rotor fluidly couples the first actuator port and the pump port, and the rotor fluidly couples the second actuator port and the reservoir port; and
        a second actuating position in which the rotor fluidly couples the second actuator port and the pump port, and the rotor fluidly couples the first actuator port and the reservoir port; and
    a disk disposed within the cavity and fixedly coupled to a wall of the cavity, the sealing surface of the rotor engaged with the disk, the disk having openings corresponding to the pump port, the reservoir port, the first actuator port, and the second actuator port.

2. The apparatus of claim 1, wherein, when the rotor is in the first actuating position, the first passageway fluidly couples the first actuator port and the pump port, and the second passageway fluidly couples the second actuator port and the reservoir port.

3. The apparatus of claim 2, wherein, when the rotor is in the second actuating position, the second passageway fluidly couples the second actuator port and the pump port, and the first passageway fluidly couples the first actuator port and the reservoir port.

4. The apparatus of claim 3, wherein the rotor is rotatable to a neutral position in which the first actuator port and the second actuator port are fluidly coupled via the cavity in which the rotor is disposed.

5. An apparatus comprising:
    a manifold including:
        a reservoir port to be fluidly coupled to a reservoir of fluid;
        a pump port to be fluidly coupled to a pump;
        a first actuator port to be fluidly coupled to a first chamber of an actuator; and
        a second actuator port to be fluidly coupled to a second chamber of the actuator;
    a rotor disposed in a cavity formed in the manifold, the rotor having a sealing surface with a first pair of openings connected by a first passageway formed in the rotor, a second pair of openings connected by a second passageway formed in the rotor, and a third pair of openings connected by a third passageway formed in the rotor, the rotor rotatable between:
        a first actuating position in which the first passageway of the rotor fluidly couples the first actuator port and the pump port, and the second passageway of the rotor fluidly couples the second actuator port and the reservoir port;
        a second actuating position in which the second passageway of the rotor fluidly couples the second actuator port and the pump port, and the first passageway of the rotor fluidly couples the first actuator port and the reservoir port; and
        a neutral position in which the first actuator port and the second actuator port are fluidly coupled via the cavity in which the rotor is disposed, and the third passageway fluidly couples the pump port and the reservoir port.

6. The apparatus of claim 5, wherein the first, second, and third passageways are parallel to each other.

7. The apparatus of claim 1, wherein the disk has annular raised ridges around the openings in the disk.

8. The apparatus of claim 1, wherein the rotor and the disk are constructed of tungsten carbide.

9. The apparatus of claim 1, further including a piston disposed in the manifold, the piston to bias the rotor into the disk.

10. An apparatus comprising:
    a manifold including:
        a reservoir port to be fluidly coupled to a reservoir of fluid;
        a pump port to be fluidly coupled to a pump;

a first actuator port to be fluidly coupled to a first chamber of an actuator; and
a second actuator port to be fluidly coupled to a second chamber of the actuator;
a rotor disposed in a cavity formed in the manifold, the rotor having a first flow path coupling a first pair of openings, a second flow path coupling a second pair of openings, and a third flow path coupling a third pair of openings, the rotor rotatable between:
a first actuating position in which the rotor fluidly couples the first actuator port and the pump port, and the rotor fluidly couples the second actuator port and the reservoir port; and
a second actuating position in which the rotor fluidly couples the second actuator port and the pump port, and the rotor fluidly couples the first actuator port and the reservoir port; and
a shaft coupled to and extending from the rotor, the rotor and the shaft coupled via a spring pin that enables the rotor to pivot relative to the shaft.

11. An apparatus comprising:
a manifold including:
a reservoir port to be fluidly coupled to a reservoir of fluid;
a pump port to be fluidly coupled to a pump;
a first actuator port to be fluidly coupled to a first chamber of an actuator; and
a second actuator port to be fluidly coupled to a second chamber of the actuator;
a rotor disposed in a cavity formed in the manifold, the rotor having a first flow path coupling a first pair of openings, a second flow path coupling a second pair of openings, and a third flow path coupling a third pair of openings, the rotor rotatable between:
a first actuating position in which the rotor fluidly couples the first actuator port and the pump port, and the rotor fluidly couples the second actuator port and the reservoir port; and
a second actuating position in which the rotor fluidly couples the second actuator port and the pump port, and the rotor fluidly couples the first actuator port and the reservoir port; and
a handwheel coupled to the rotor by a shaft.

12. An apparatus comprising:
a hand pump;
a reservoir;
a manifold having flow paths to fluidly connect to the hand pump, the reservoir, and first and second chambers of an actuator;
a handwheel rotatably coupled to the manifold to be rotated by a human operator, the handwheel rotatable to:
a first actuating position to enable the hand pump to supply hydraulic fluid from the reservoir to the first chamber to move a shaft of the actuator in a first direction;
a second actuating position to enable the hand pump to supply hydraulic fluid from the reservoir to the second chamber to move the shaft of the actuator in a second direction opposite the first direction; and
a neutral position in which the first and second chambers of the actuator are fluidly coupled; and
a pneumatic reset cylinder to, when actuated, rotate the handwheel from the first actuating position or the second actuating position to the neutral position.

13. The apparatus of claim 12, wherein the neutral position is between the first and second actuating positions.

14. An apparatus comprising:
a manifold including:
a first port to be fluidly coupled to a first chamber of an actuator;
a second port to be fluidly coupled to a second chamber of the actuator;
a third port to be fluidly coupled to a hand pump; and
a fourth port to be fluidly coupled to a reservoir;
a selector valve including a rotor disposed in a cavity of the manifold, the rotor having pairs of openings connected by respective passageways formed in the rotor, the rotor being rotatable in the cavity to align the pairs of openings with certain openings in a wall in the cavity that are fluidly coupled to the first, second, third, and fourth ports; and
a disk fixedly coupled to the wall in the cavity of the manifold, the disk having disk openings aligned with the openings in the wall of the cavity that are fluidly coupled to the first, second, third, and fourth ports.

15. The apparatus of claim 14, further including:
a shaft coupled to the rotor and extending outward from the manifold; and
a handwheel coupled to the shaft such that rotation of the handwheel causes rotation of the rotor in the cavity.

16. The apparatus of claim 1, wherein the rotor includes a bore defined in the sealing surface, the apparatus further including:
a shaft inserted into the bore and coupled to the rotor; and
a handwheel coupled to the shaft.

17. The apparatus of claim 1, wherein the rotor includes a set of detent grooves formed in an outer peripheral surface of the rotor, the apparatus further including a detent pin disposed in a bore in the manifold, the detent pin biased toward the outer peripheral surface of the rotor.

18. The apparatus of claim 12, wherein the shaft is a first shaft, and wherein a second shaft extends from the pneumatic reset cylinder, the second shaft coupled to a piston disposed inside of the pneumatic reset cylinder, the second shaft coupled to the handwheel.

19. The apparatus of claim 18, wherein the second shaft is coupled to the handwheel via a pivot pin.

20. The apparatus of claim 18, wherein the handwheel is rotated into the neutral position when the second shaft is retracted into the pneumatic reset cylinder.

* * * * *